Sept. 6, 1966          E. W. CLEM          3,270,628
UNIVERSAL BOX FOLDING MACHINE
Filed Sept. 20, 1962                    16 Sheets-Sheet 1

INVENTOR.
EVERETT W. CLEM
BY
Mandeville & Schweitzer
ATTORNEYS

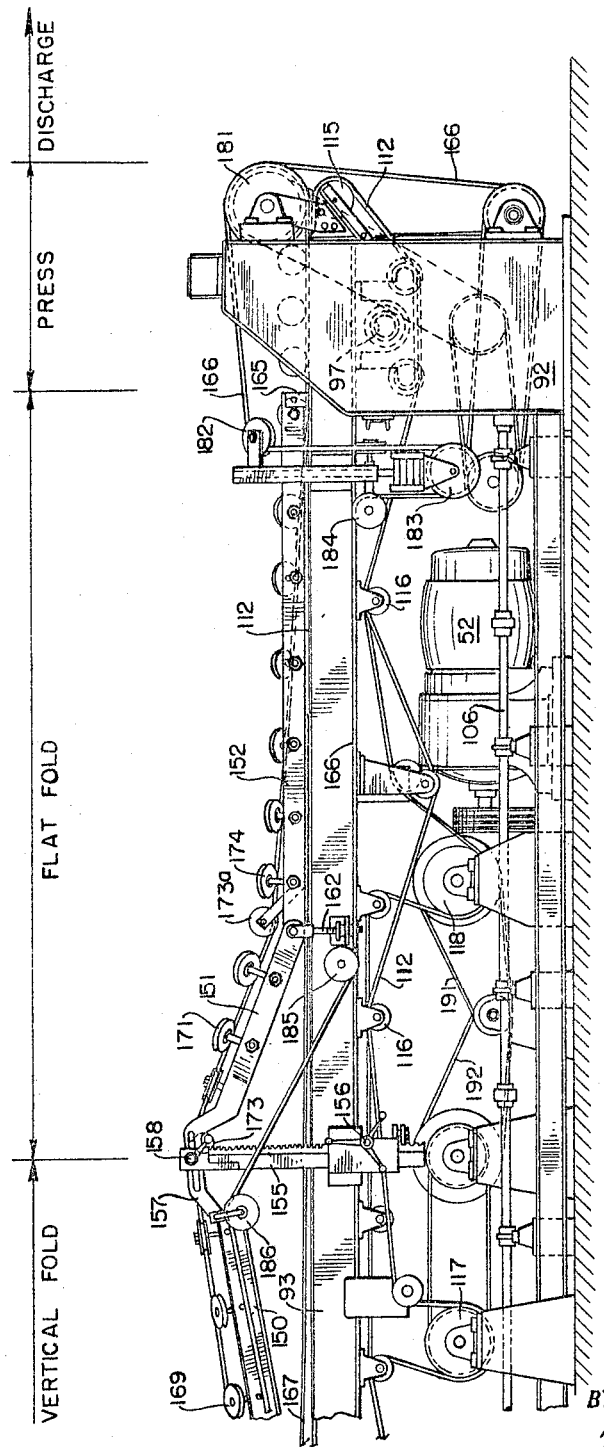

Sept. 6, 1966  E. W. CLEM  3,270,628
UNIVERSAL BOX FOLDING MACHINE
Filed Sept. 20, 1962  16 Sheets-Sheet 3

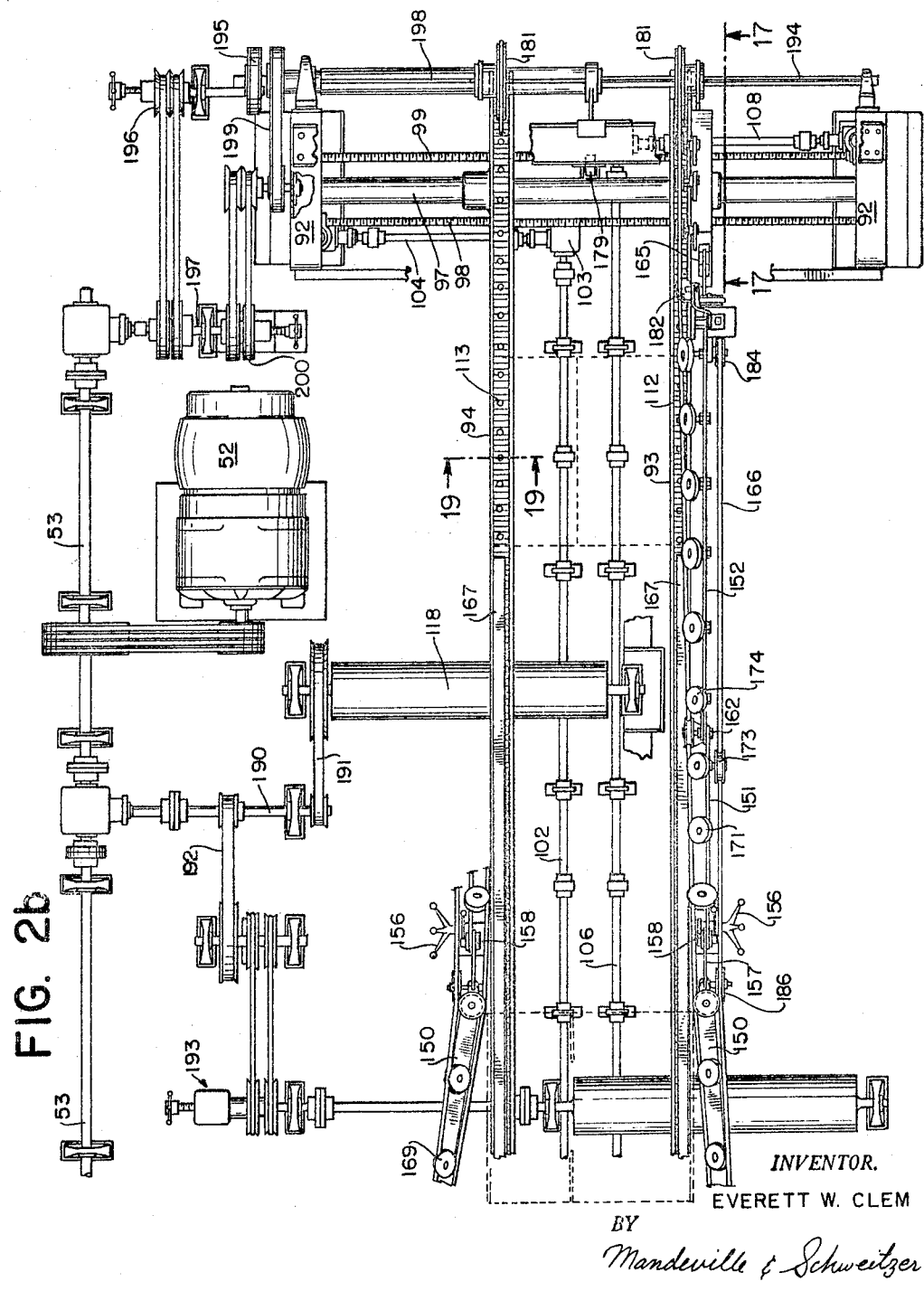

Sept. 6, 1966 E. W. CLEM 3,270,628
UNIVERSAL BOX FOLDING MACHINE
Filed Sept. 20, 1962 16 Sheets-Sheet 5
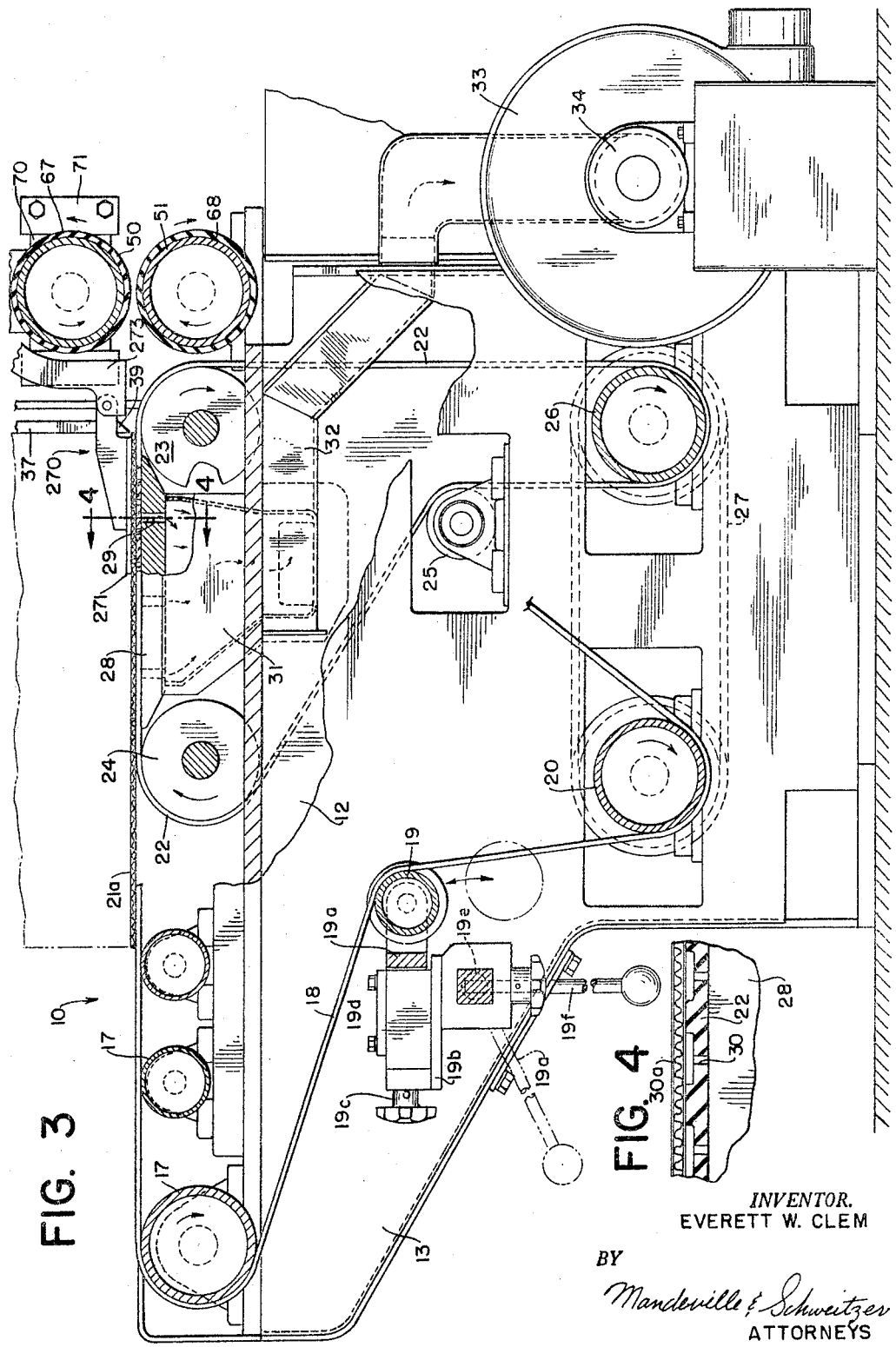
*INVENTOR.*
EVERETT W. CLEM
BY
*Mandeville & Schweitzer*
ATTORNEYS Sept. 6, 1966    E. W. CLEM    3,270,628
UNIVERSAL BOX FOLDING MACHINE
Filed Sept. 20, 1962    16 Sheets-Sheet 6
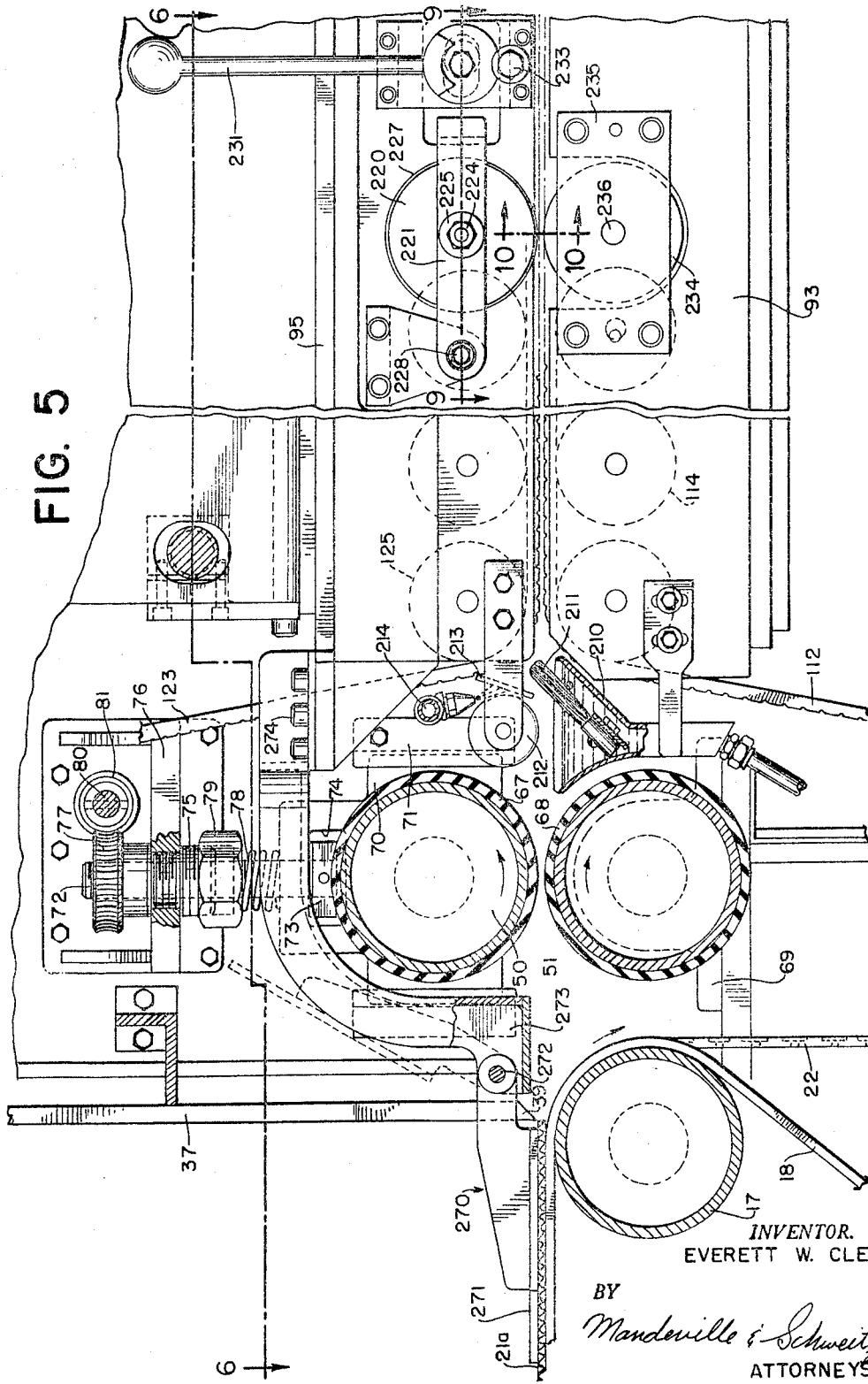
INVENTOR.
EVERETT W. CLEM
BY
Mandeville & Schweitzer
ATTORNEYS

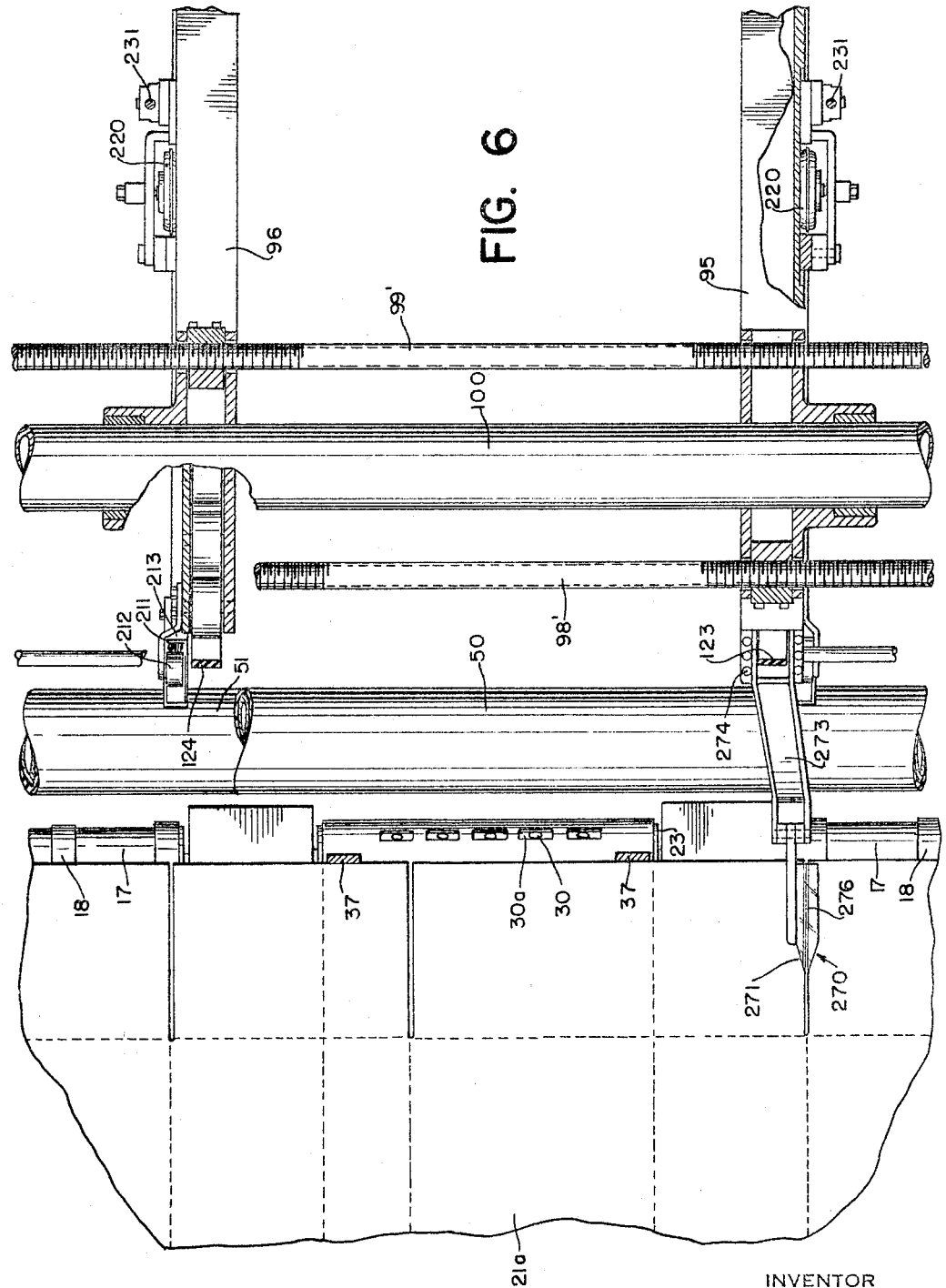

INVENTOR.
EVERETT W. CLEM
ATTORNEY

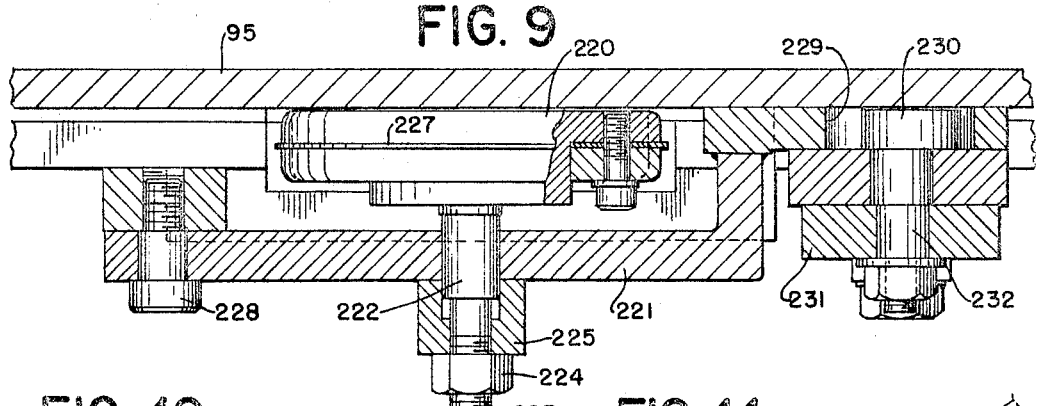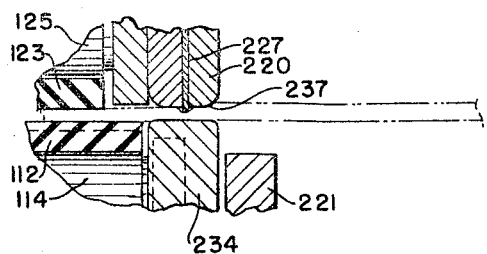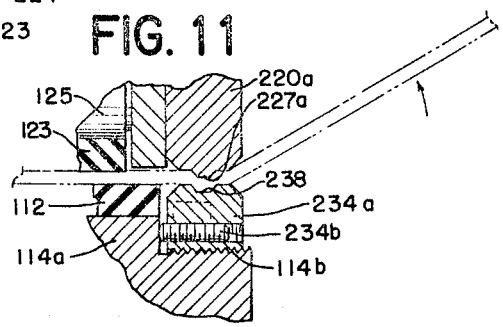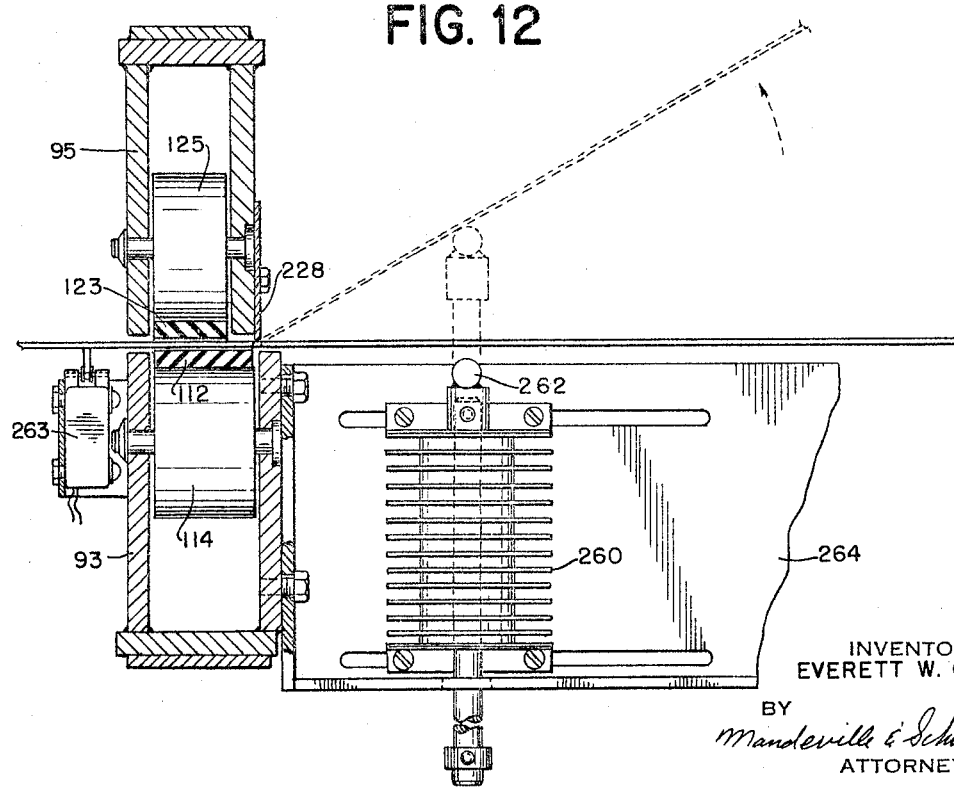

Sept. 6, 1966 E. W. CLEM 3,270,628
UNIVERSAL BOX FOLDING MACHINE
Filed Sept. 20, 1962 16 Sheets-Sheet 10

INVENTOR
EVERETT W. CLEM
BY
Mandeville & Schweitzer
ATTORNEYS

Sept. 6, 1966  E. W. CLEM  3,270,628
UNIVERSAL BOX FOLDING MACHINE
Filed Sept. 20, 1962  16 Sheets-Sheet 11
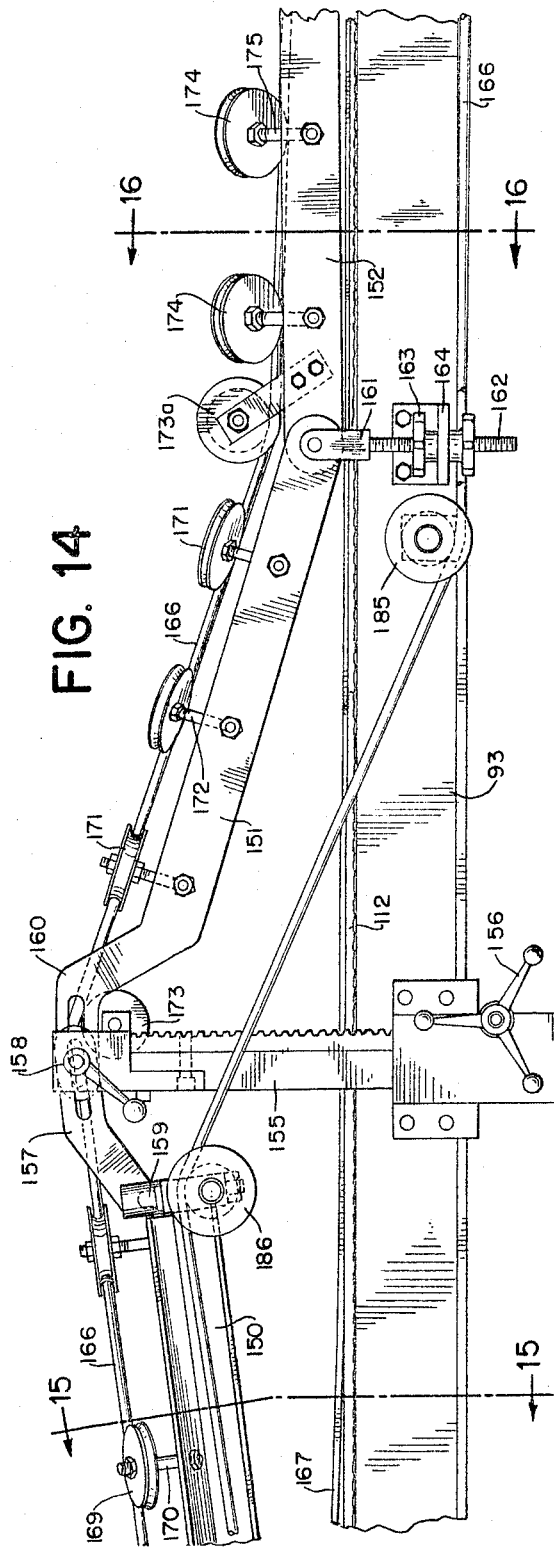
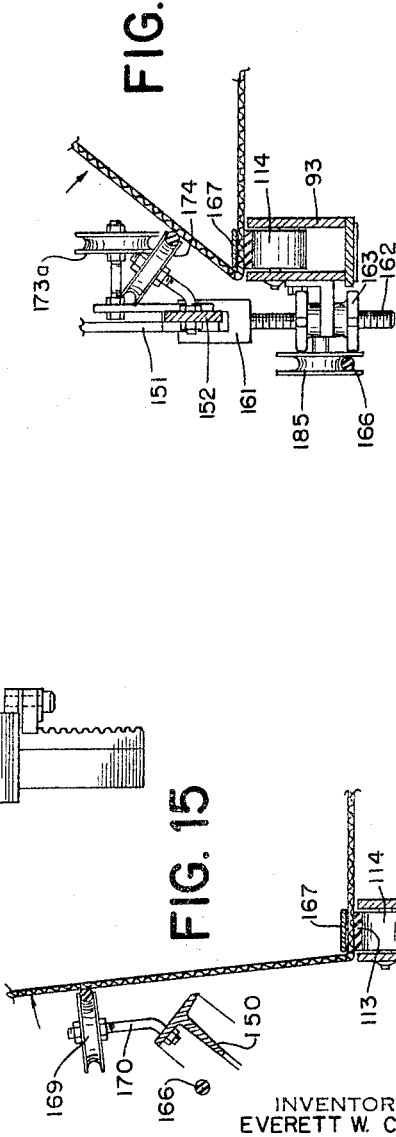
INVENTOR
EVERETT W. CLEM
BY
Mandeville & Schweitzer
ATTORNEYS Sept. 6, 1966  E. W. CLEM  3,270,628
UNIVERSAL BOX FOLDING MACHINE
Filed Sept. 20, 1962  16 Sheets-Sheet 12

INVENTOR.
EVERETT W. CLEM
BY
Mandeville & Schweitzer
ATTORNEYS

Sept. 6, 1966  E. W. CLEM  3,270,628
UNIVERSAL BOX FOLDING MACHINE
Filed Sept. 20, 1962  16 Sheets-Sheet 13
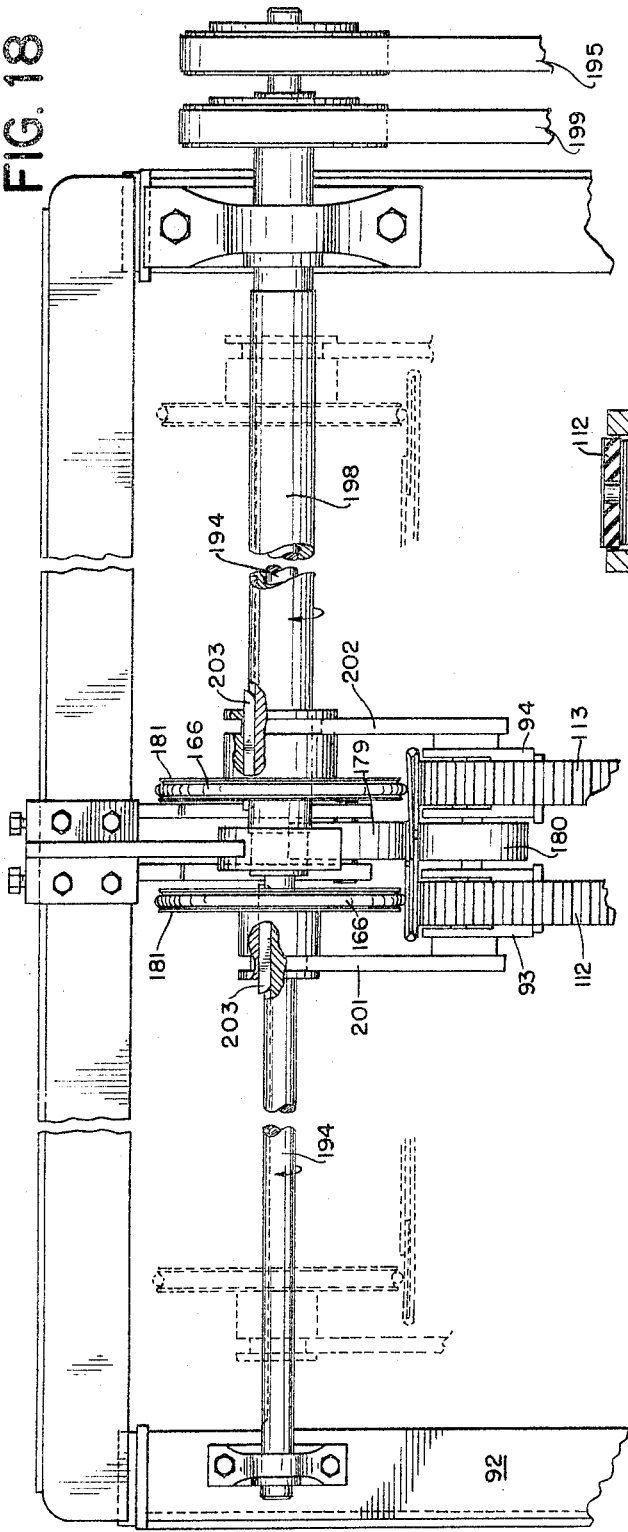
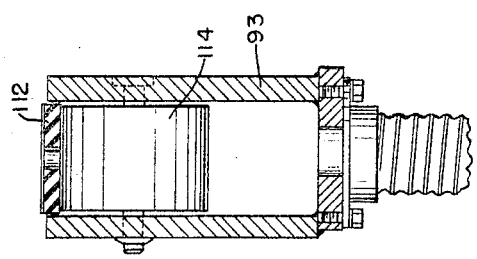
INVENTOR.
EVERETT W. CLEM
BY
Mandeville & Schweitzer
ATTORNEYS

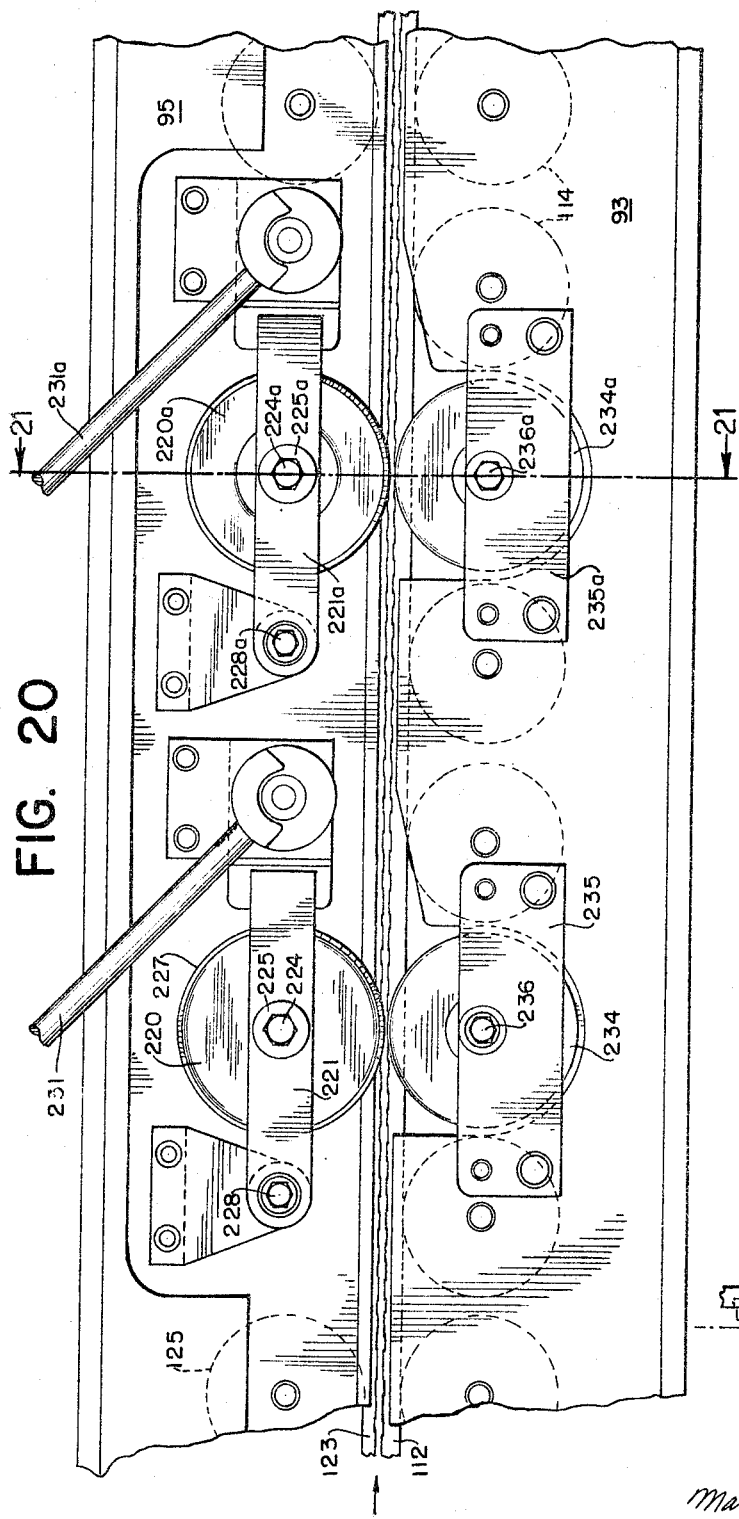

Sept. 6, 1966            E. W. CLEM          3,270,628

UNIVERSAL BOX FOLDING MACHINE

Filed Sept. 20, 1962                                    16 Sheets-Sheet 15

INVENTOR
EVERETT W. CLEM
BY
Mandeville & Schweitzer
ATTORNEYS

Sept. 6, 1966          E. W. CLEM          3,270,628
UNIVERSAL BOX FOLDING MACHINE
Filed Sept. 20, 1962                    16 Sheets-Sheet 16
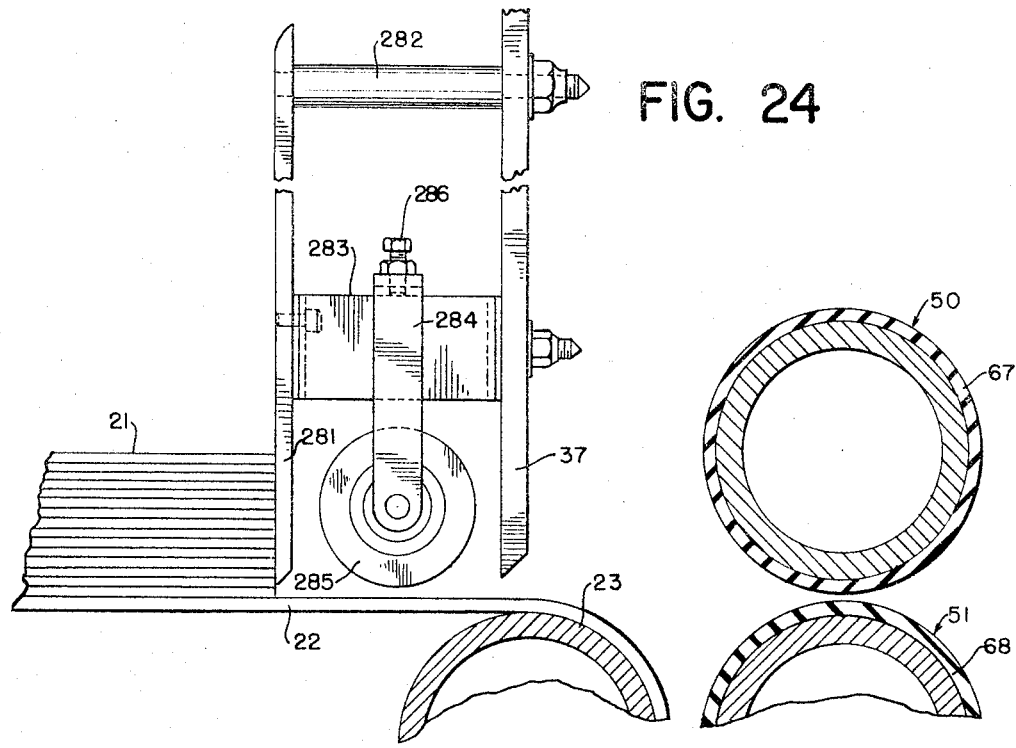
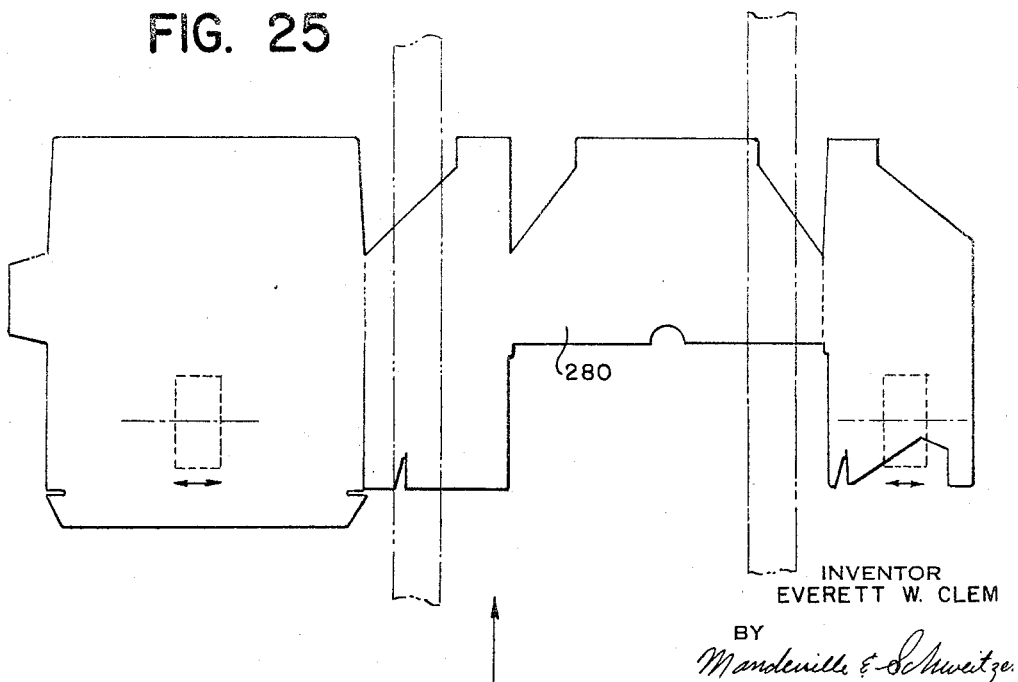
INVENTOR
EVERETT W. CLEM
BY
*Mandeville & Schweitzer*
ATTORNEYS

3,270,628
UNIVERSAL BOX FOLDING MACHINE
Everett W. Clem, Shrewsbury, Mass., assignor to Specialty Equipment Corporation, Worcester, Mass., a corporation of Massachusetts
Filed Sept. 20, 1962, Ser. No. 224,951
56 Claims. (Cl. 93—52)

The present invention relates to box folding machines in general, and is directed more specifically to various significant improvements in box folding machines, for improving the operation of the machines and for rendering machines substantially more efficient and versatile than heretofore. Although the invention is not necessarily so limited, it is intended specifically for the folding of box blanks formed of corrugated board.

It is conventional practice in the corrugated box industry to perform, as an intermediate manufacturing procedure, a folding and gluing operation, in which flat blanks of corrugated board or like box material are folded over and glued, to form a flat tube. The flat tube later may be erected, to form a rectangular tube, for example, in preparation for subsequent filling and closing operations.

In the past, conventional machines for folding and gluing cartons, particularly those formed of corrugated board, typically have been of complicated and expensive construction, yet have been designed for operation with an extremely limited range of types and sizes of box blanks. This has been necessitated by the fact that the folding and gluing of die cut corrugated box blanks in particular tends to be a sensitive production procedure, which, when automated, gives rise to substantial problems involving the jamming and/or skewing of the blanks. Thus, in the past, it has been rather conventional to automate folding and gluing procedures only for extremely large production runs, while carrying out the smaller production runs by manual or semi-manual operations. Moreover, where a wide variety of box blanks must be handled in relatively small production runs, the time and expense involved in the "setup" for automated production has, with conventional machines, sufficiently balanced or outweighed the savings achieved by the machine production that such operations have continued to be performed on a substantially manual basis.

As an overall objective, the present invention provides a machine for the folding and gluing of corrugated and other box blanks which includes operating and structural features rendering the machine extremely versatile in operation, capable of handling an extremely wide variety of sizes, types and shapes of box blanks, and adapted for extremely rapid and expeditious setup adjustment, so that the preparatory operations are economically justified, even for extremely short production runs. In addition the machine of the invention includes a number of novel and improved features which enable folding and gluing operations to be carried out, automatically and at high speed, with box blanks of an extremely wide variety of size, shape and thickness, such that the machine of the invention is ideally suited for the variety manufacturer and for short runs.

One of the specific features of the invention resides in the provision of an improved feed table structure, for supplying flat box blanks in one at a time succession, which is designed and arranged for the convenient handling of box blanks of extremely large size, as well as blanks of unusually small size and of unusual configuration. In this respect, the feed table arrangement of the invention incorporates conventional suction belt means for gripping and feeding box blanks in succession, but employs an unusually small suction belt in novel cooperative relation with supporting feed means and in a novel feed table configuration, enabling both small and large box blanks to be handled with great facility. Moreover, the new feed table arrangement includes a novel attachment enabling the expeditious handling and feeding of die cut blanks of unusual configuration, which have not been capable of accommodation in machines of conventional construction.

In accordance with another specific aspect of the invention, novel box blank feeding means are provided for a so-called "untimed" folder-gluer machine, which includes a novel arrangement of "pull-out" rollers which receive box blanks from the feed table and draw them from the table at slightly higher speed, to provide a predetermined spacing between successive blanks. As a particularly advantageous feature of the invention, one of a pair of pull rollers is driven at a slightly reduced speed, through an overrunning clutch arrangement to provide, in a manner to be described in more detail, a particularly advantageous and reliable feed arrangement. In addition, a novel and improved interrelated drive system is provided between the feed table and the pull rollers, such that accurate regulation of the spacing between successive blanks is readily achieved and such that single box blanks may readily be sent through the machine to facilitate setup and adjustment operations and to carry out these operations with a minimum loss of blanks and with a minimum loss of time due to jamming of successive blanks.

In a typical folding and gluing operation, a box blank is folded about spaced, longitudinal fold axes, so that outer foldable panels of the blank are brought into flat-folded, slightly overlapping relation. To accommodate blanks of various sizes, the machine is provided with laterally adjustable side frames, on which are mounted transport belts for conveying the box blanks, straight edges and other facilities for achieving accurate fold, folding belts for carrying the foldable panels through 180° fold manipulations, and other facilities involved in the folding and gluing opeartions. One of the specifically difficult and time-consuming operations involved in the set up of a conventional folder gluer machine resides in the initial adjustment of the side frames and related elements in precise relationship to folding scores on the box blanks. Thus, one of the further specific aspects of the invention resides in the provision of novel, improved and greatly simplified line-up facilities for a universal box folding machine, which enables the various necessary line-up operations to be carried out at greatly increased speed, relative to known procedures, while at the same time providing for significantly improved accuracy in the line-up operation and reducing the number of test blanks required to be sent through the machine and perhaps discarded as rejects. In this respect, the provisions of the invention enable the machine to be lined up directly with respect to the fold lines of the carton blank, avoiding all measurements and other operations, heretofore thought to be necessary, which are both time-consuming and inaccurate.

The machine of the invention further includes novel and improved transport arrangements for conveying box blanks through the machine, enabling the blanks to be positively gripped and fed and providing for accurate relative adjustment of feeding forces applied to opposite sides of a box blank, all to the end that box blanks of all sizes, shapes and types, over a wide operative range, may dependably be fed through the machine with the precision alignment required to achieve accurate folding.

In accordance with a further, specific but significant aspect of the invention, the new folder-gluer machine incorporates novel facilities in the entry or forward portion of the machine for preconditioning the box blanks in a particularly desirable and effective manner, such that the blanks subsequently may be folded in an accurate and precise manner. One such preconditioning treatment resides in the so-called "refresher scoring" of the box blanks, whereby blanks with little or no residual scoring, due to various aging tendencies are rescored or rescored and crushed in an accurate and effective manner and thereby rendered properly conditioned for subsequent folding operations. Another such preconditioning treatment resides in the moistening of the box blanks along limited longitudinal areas in the immediate region of and including the fold axes, enabling the blank to be subsequently folded through a large angle with a minimum of force and without rupturing the board along the crease.

A further preconditioning treatment provided by the machine of the invention and applicable with particular advantage to certain types of box blanks having cross corrugations is a so-called "prebreak" operation, in which the foldable outer panels of the blank are acted upon with impact to "break" the board along its crease lines and impart a slight initial fold to the blank. This operation desirably conditions at least certain types of blanks for subsequent engagement by folding belts, which actually complete the overfolding of the panels.

A particularly advantageous and important aspect of the invention resides in the provision of novel and improved folding belt arrangements for engaging the foldable outer panels of a box blank being conveyed through the machine and carrying the panels in a novel and desirable manner through a 180° fold, into the desired overlapping relation. Specifically, one of the significant features of the improved folding belt arrangement resides in the provision of novel flat folding belt sections for carrying the foldable panels from vertical positions into flat, overlapping positions in a uniform and controlled manner heretofore not obtained, such that the travelling box blank can be and is maintained under accurate control at all times. In this respect, in machines presently known to the industry, flat folding of the panels is carried out in a substantially uncontrolled manner in which, particularly with large box blanks, significant windage is created during the flat folding operation, which can and often does cause the travelling box blanks to become misaligned with and otherwise out of control in the machine. In accordance with the present invention, the panel folding operation is carried out in two rather distinct stages, but in such a manner that a substantially uniform angular amount of fold-over is achieved per unit of linear advance of the box blanks during the flat fold stage.

An additional significant feature of improvement, in connection with the folding belt section of the machine, resides in the provision of novel folding belt assemblies, including vertical fold, as well as flat fold, sections of the folding belt structure, whereby independent lateral and vertical adjustment of opposed folding belt sections may be carried out and whereby independent speed regulation of the folding belts, relative to each other and to the main transport means of the machine, may be carried out Moreover, the improved machine includes means for effecting independent speed adjustment of separate transport belts. This significantly improved arrangement is such that box blanks of a wide variety of sizes and shapes, including highly asymmetrical blanks may be handled with precision and at all times under complete control.

In addition to the various novel and advantageous features specifically mentioned above, the machine of the invention incorporates a number of additional features of a specifically novel and advantageous form. For a more thorough understanding of these various significant inventive features, reference should be made to the following detailed description and to the accompanying drawing, in which:

FIGS. 1a and 1b, taken together, constitute a side elevational view, with parts broken away, of a novel and improved universal box folding and gluing machine incorporating the various features of the invention;

FIGS. 2a and 2b, taken together, constitute a top plan view of the folder-gluer machine of FIGS. 1a and 1b;

FIG. 3 is an enlarged, fragmentary cross sectional view taken generally along line 3—3 of FIG. 2a and illustrating particularly details of the feed table arrangements of the machine of the invention;

FIG. 4 is an enlarged, fragmentary cross sectional view taken generally along line 4—4 of FIG. 3;

FIG. 5 is an enlarged, fragmentary, cross sectional view taken generally along line 5—5 of FIG. 2a;

FIG. 6 is a cross sectional view taken generally along line 6—6 of FIG. 5;

FIGS. 9 and 10 are enlarged, fragmentary cross sectional views taken generally along lines 9—9, 10—10 respectively of FIG. 5, and illustrating refresher scoring means incorporated in the machine of the invention;

FIG. 11 is an enlarged fragmentary cross sectional view similar to FIG. 10, illustrating a modified form of refresher scoring means;

FIG. 12 is an enlarged, fragmentary, cross sectional view taken generally along line 12—12 of FIG. 2a and illustrating a prefold arrangement incorporated in the machine of the invention;

FIG. 14 is an enlarged, fragmentary elevational view illustrating structural features of the novel folding belt section of the new machine;

FIGS. 15 and 16 are fragmentary cross sectional views taken generally along lines 15—15, 16—16 respectively of FIG. 14;

FIG. 18 is a fragmentary and elevational view showing structural details of the discharge end of the machine;

FIG. 19 is a cross sectional view of a modified arrangement for transporting box blanks, incorporating suction transport belt means;

FIG. 20 is a fragmentary elevational view of a modified arrangement for performing rescoring in successive stages, and/or for crushing box blanks along their fold lines;

FIG. 24 is an enlarged, fragmentary elevational view of a novel attachment for application to the feed table, for improved handling and feeding of box blanks of unusual configuration;

FIG. 25 is a plan view of a box blank of unusual configuration, such as would advantageously be accommodated by the attachment of FIG. 24;

FIG. 26 is an enlarged, fragmentary cross sectional view of a box blank, indicating typical alignment of a folding crease thereof with a folding straight edge of the machine;

FIGS. 27, 28 are enlarged fragmentary cross sectional views of box blanks illustrating rescoring and crushing, respectively, of folding creases of the blanks; and FIGS. 29, 30 are enlarged, fragmentary cross sectional views illustrating the overfolding of box blanks having crushed and uncrushed folding creases.

Figure 1A:
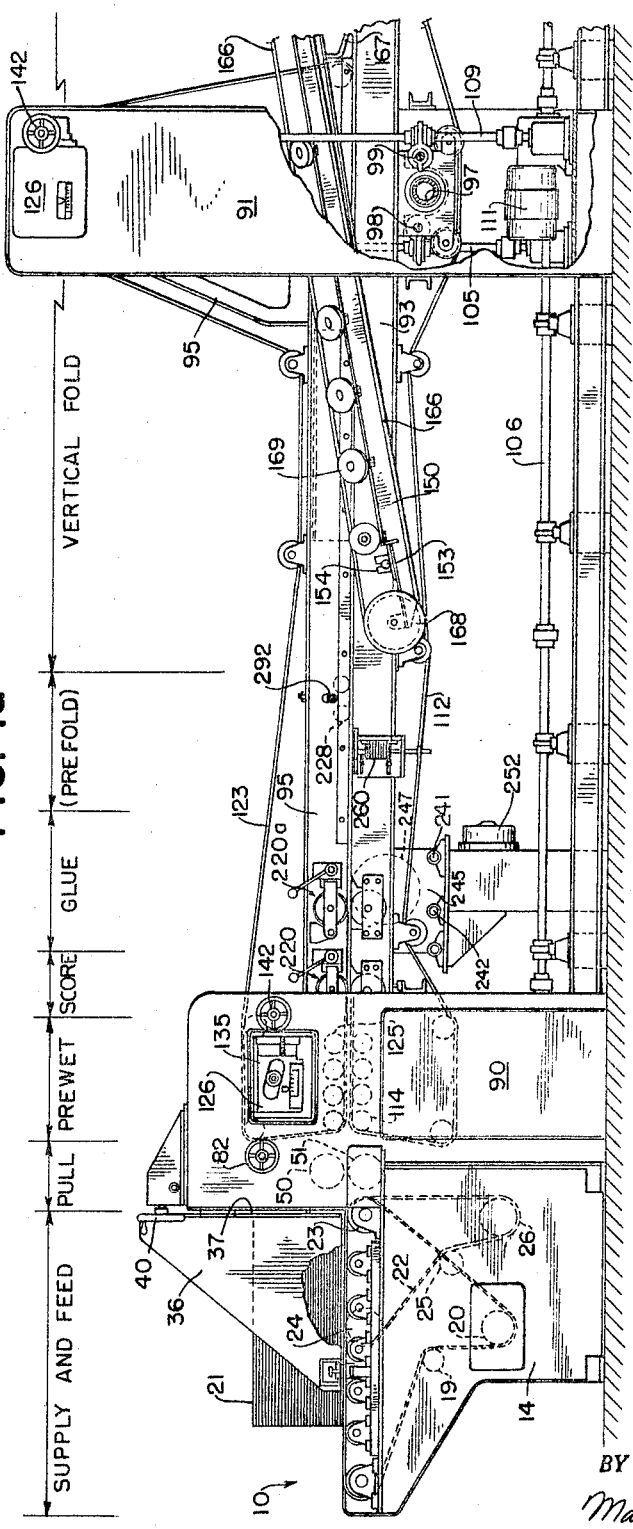

Referring now to the drawing, and initially and generally to FIGS. 1a, 1b, the machine of the invention is shown to comprise a plurality of operating sections arranged in sequence to perform various sequential operations upon a box blank. Thus, at the forward or entry end of the machine, there is a "supply and feed" section, which supports a vertical stack of box blanks and feeds them in one-by-one succession at a predetermined speed. The blanks thus fed pass into a "pull" section which engages the blanks successively and draws them at a predetermined higher speed, at which the remainder of the machine operates, to provide a predetermined spacing between successive blanks. The blanks are thereupon fed into a "transport" section of the machine, which advances the blanks longitudinally along the entire length of the machine, until the blanks, in folded condition, are finally discharged at the rearward end of the machine.

At the entry end of the transport section of the machine, there is provided a "prewetting" or moistening section, in which the creases of the blank are moistened and conditioned for easy folding; and thereafter the blanks are passed through a rescoring and crushing section, in which the scores initially provided in the box blank are "refreshed" to insure straight, accurate folding, and, particularly with heavy blanks, the score is crushed in an advantageous manner to accommodate a 180° fold without undesirable bulges or deformations. Conveniently, at this stage, the blanks are conveyed through a "gluing" section, in which glue is applied to a predetermined tab or margin of the box blank such that, when the folding operation is completed, the flat, overfolded panels are adhesively secured.

Following the gluing stage, the blanks (particularly blanks with cross corrugations) pass through an optional "pre-break" stage, in which the foldable outer panels of the blank may be subjected to an upward impact force to effect a sharp initial "break" of the crease and facilitate the subsequent folding operations. The pre-break operation may be particularly desirable in conjunction with blanks having foldable panels of substantial length, longitudinally of the machine, which are connected to the main body of the box blank along a very short score line.

The box blanks being advanced longitudinally along the machine, in a predetermined, horizontal transport plane are next brought into a "vertical fold" section of the machine, in which the outer, foldable panels of the blank are engaged by upwardly inclined and converging folding belt sections which, in the course of the continued longitudinal advancement of the blank, with its main body portion being retained in the transport plane, cause the outer panels to be folded upwardly into vertical disposition.

After the box blanks have been advanced through the vertical fold section of the machine, they enter the "flat fold" section, in which the initially vertically oriented panels are folded inwardly, in a uniform and controllable manner, into flat overlapping relation. The folded blanks then advantageously pass through a "pre-compression" zone, and then a "pressing" stage, in which the overlapped margins of the folded panels are pressed together and firmly secured by the previously applied adhesive. The folded and glued blanks are thereafter discharged from the machine, advantageously into the entry of a subsequent machine (not shown and forming no part of the present invention) which aligns, stacks, conveys and perhaps performs other operations as may be desired.

*Feed table assembly*

Referring now to FIGS. 1–4, the reference numeral 10 designates generally a feed table assembly forming part of the machine of the invention. The assembly 10 incorporates a plurality (advantageously four) of frame sections 11–14 which are arranged to form three side-by-side table sections, including a central table section 15 and outer table sections 16.

Each of the outer table sections 16 comprises a plurality of rollers 17, journaled in respective outer pairs of the frame sections and arranged so that their upper surfaces form a horizontal plane. A plurality of supporting and feeding belts 18 is trained over the rollers 17, such that the upper surfaces of the belts form the upper working surface of each of the outer feed table sections 16. The belts 18, as shown particularly in FIG. 3, are trained about take-up rollers 19 and about driving drums 20, located in the lower portion of the frame structure, such that the plurality of feeding belts may be driven in unison, at a predetermined speed, using drive input arrangements forming another part of this invention and to be described in greater detail.

Advantageously, the feeding and supporting belts 18, which may be referred to as auxiliary feeding belts, are slidable laterally along the various rollers 17, 19, 20, about which they are trained, so that the lateral location of the belts may be optimized with respect to the size and configuration of a particular box blank handled by the supply table assembly.

In accordance with one specific feature of the invention, separate rollers 19 are provided for each of the six auxiliary feeding belts 18, and each of the rollers 19 is movably mounted to act as a quick-release take-up roller, enabling individaul belts to be disengaged when their operation is not required by reason of the size and/or shape of the box blank. As shown in FIG. 3, the rollers are mounted on arms 19a, which are adjustable longitudinally in mounting brackets 19b, by means of a hand knob 19c and screw 19d. The bracket 19b is pivotally mounted on a transverse shaft 19e and held in either of two alternative positions by a handle 19f which seats in detent notches 19g in a slotted plate 19h. When the handle 19f is in its forward or "active" position, the take-up roller 19 associated therewith is raised into the path of its belt 18, to tighten the belt and cause it to be driven in a feeding direction, the hand knob 19c having been properly adjusted to provide the desired belt tension.

To render a particular auxiliary belt inactive, the handle 19f is released from its forward detent notch and moved to its rear detent notch, swinging the bracket 19b and the take-up roller 19 downward to an "inactive" position in which the belt tension is released.

As indicated particularly in FIG. 3, the upper surface portions of the respective frame sections 11–14 lie slightly below the working plane formed by the auxiliary feeding belts 18, so that the upper surfaces of the frames will clear the lower box blank and not exert any retarding force on the feeding of the blanks.

In accordance with one aspect of the invention, the central feed table section 15 has a relatively small effective width, in relation to the total effective width of the entire feed table. Thus, in a machine incorporating a feed table whose effective width is around 80 inches, the effective width (between the frame sections 12, 13) of the central table section 15 advantageously may be about seventeen inches. According to the invention, the central feed table section constitutes the principal means for feeding blanks from the bottom of a vertical supply stack 21 (FIG. 1) and, to this end, there is provided a suction belt 22 which is trained about a pair of supporting rollers 23, 24, such that a portion of the suction belt travels in the horizontal working plane of the feed table for gripping engagement with the lower surface of the bottommost box blank of the supply stack.

As shown in FIG. 3, the suction belt 22 is trained about an idle roller 25 and also about a driving drum 26, the latter being connected through a belt 27 to the driving drum 20 for the auxiliary feeding belts 18, such that the suction belt 22 operates in synchronism with the operative auxiliary feeding belts 18.

Positioned between the upper supporting rollers 23, 24 for the suction belt is a suction platform 28 having a flat upper surface for engaging and supporting the horizontal reach of the suction belt between its supporting rollers and provided with a plurality of transverse slots 29 arranged to establish communication betwen suction openings 30 (FIG. 4) in the suction belt and a suction chamber 31. The suction chamber 31 is maintained in an evacuated condition through duct means 32, which connect the chamber to the intake of a blower 33 driven by a motor 34.

When the feed table is in operation, the suction belt 22 is advanced by means of its driving drum 26, so that the large plurality of suction openings 30 in the belt pass successively over the suction passages 29 in the platform 28. Suction is thus applied to the lowermost box blank of the supply stack, causing the blank to be gripped firmly by the suction belt and advanced in a forward direction, along with the belt. Advantageously, the suction openings 30 in the belt 22 include transversely elongated or otherwise extended recesses 30a, which extend the effective suction area of the openings to improve the grip of the suction belt upon the lowermost box blank.

As one of the significant aspects of the present invention, the feed table assembly, as well as the machine in general, is adapted to handle an extremely wide variety of sizes and shapes of box blanks, ranging from blanks whose open area is substantially as large as that of the entire feed table, to blanks whose principal dimensions may be on the order of a few inches. Accordingly, and as illustrated particularly in FIG. 2a, the working surface of the suction belt 22 is substantially smaller than that of the feed table as a whole. Specifically, in the illustrated feed table assembly, the width of the suction belt is on the order of 25% of the width of the feed table assembly, and the effective length of the suction belt is only about one-half that of the overall feed table.

Figure 2A:
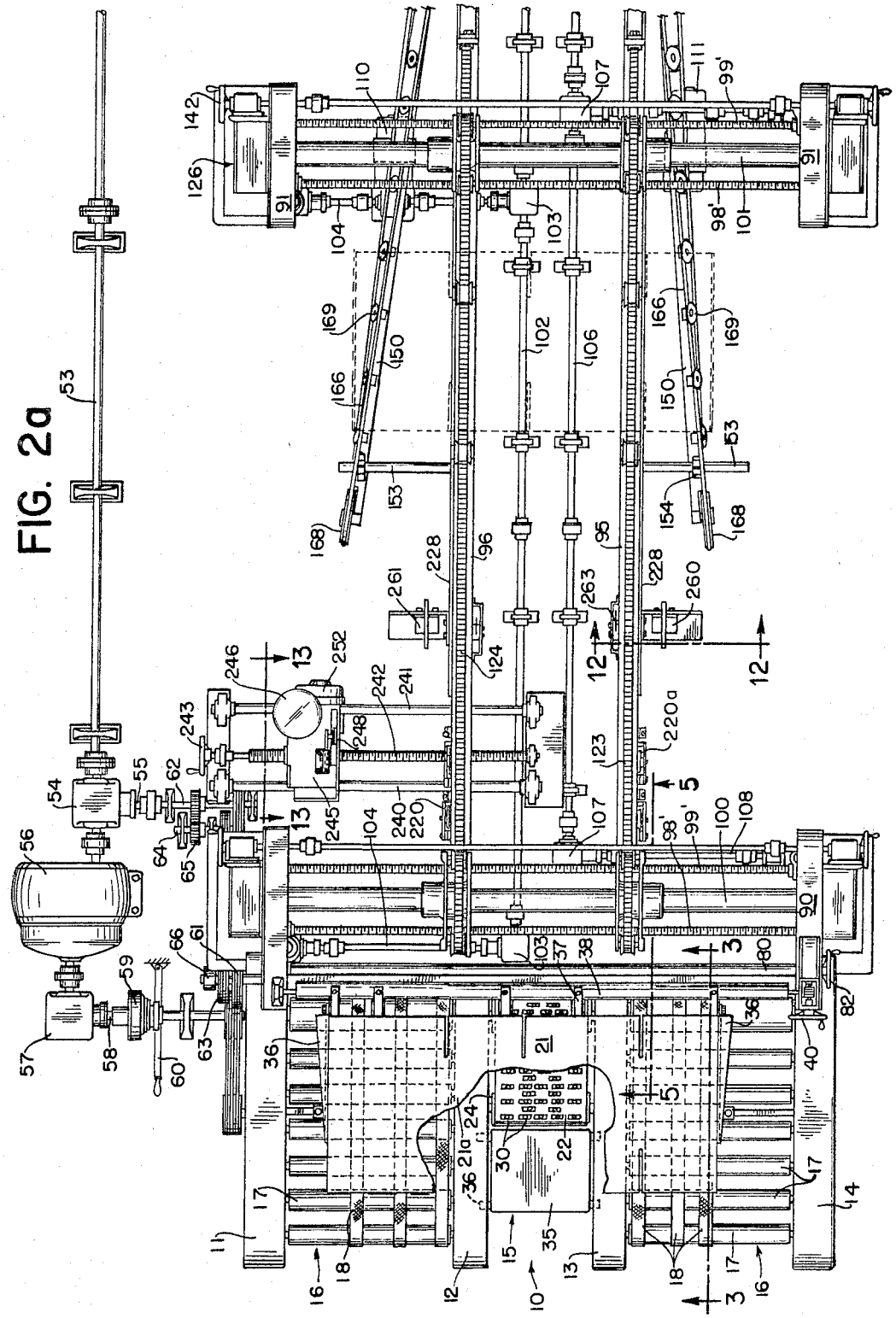

In order to accommodate the handling of box blanks of extremely small size, the suction belt 22 is located in the forward, central portion of the feed table assembly, such that small size blanks, in proper position on the feed table, are supported directly on the suction belt itself, while larger size blanks, such as that illustrated at 21a in FIG. 2a are arranged so that their central, forward portions are engaged and supported by the suction belt.

In order to provide convenient access for the handling of extremely small size box blanks, while at the same time affording adequate support for blanks of the largest size, the feed table assembly of the invention includes an auxiliary supporting platform 35, which is supported by brackets 36 between the frame sections 12, 13 and immediately in front of the suction belt 22. The auxiliary supporting platform 35 is arranged to lie in the working plane of the feed table, to provide proper support for large size box blanks. However, for the handling of blanks of extremely small size, the auxiliary platform 35 is lifted away and removed, permitting direct operator access to the suction belt 22 by way of the U-shaped recess formed by the frame sections 12, 13 and the rearward edge of the suction belt 22.

Proper alignment of the supply 21 of box blanks on the feed table is provided by a pair of opposed side guides 36, arranged for adjustable movement toward or away from the center of the feed table, and by a plurality of vertically disposed front edge guides 37. The edge guides 37 are supported in vertically depending relation from a horizontal cross bar 38, and the guides 37 are so disposed and arranged that their lower end extremities 39 (FIG. 3) lie a predetermined distance above the suction belt 22, substantially directly over the center line of the front supporting roller 23. The spacing between the suction belt and the guides 37 is such as to accommodate the passage of a single box blank only, to provide for the desired one-at-a-time feeding. To accommodate box blanks of different thicknesses, the supporting cross bar 38 for the guides 37 is mounted on an adjustable eccentric (not specifically shown) whereby, through manipulation of a hand wheel 40, a cross bar 38 can be raised and lowered through a limited range of adjustment.

As another specific feature of the invention, novel provisions are made for the accommodation on the feed table of box blanks of unusual shape, such as the special die-cut blank 280 illustrated in FIG. 25. These provisions, illustrated in FIG. 24, are in the form of special auxiliary attachments for the vertical, front edge guides 37, consisting of auxiliary front edge guides 281, spaced outward from the guides 37 and forming a new stop line for the box blanks. Typically two attachments are utilized, and these are attached to selected ones of the main front edge guides 37 by means of spacer brackets 282, 283.

The lower spacer bracket 283 of each attachment supports and vertically guides a support 284 of inverted, generally U-shaped configuration, which mounts a pressure roller 285 at its lower end. The roller 285 and its support are urged downward, either by its own weight or by suitable spring means (not shown) to a lower limit position determined by a stop screw 286.

In setting up the feed table assembly for handling blanks of unusual configuration, such as the blank 280 of FIG. 25, attachments are mounted on two of the front edge guides 37, which are adjusted laterally to engage predetermined front edge areas of the blank, so that the blank is held in squared position. If necessary, the attachment can have different amounts of offset to achieve this result.

When the blanks are fed under the auxiliary front edge guides 281, pressure rollers 285 and main front edge guides 37, and thence into the transport facilities of the machine (to be described) the individual blanks are held firmly on the suction belt by the pressure rollers 285, which are positioned above the table 28. Thus, even though the unusually shaped blank may be gripped asymmetrically (one side before the other) by the transport means of the apapratus, the firm grip provided by the pressure rollers 285 prevents the blank from being skewed.

*Pull-out roll assembly*

The machine of the invention is a so-called "untimed" machine, in which the succession of box blanks advancing through the machine is controlled by the speed of operation of the various components of the machine rather than, for example, the tripping of timing switches, the use of timing cams, etc. Thus, the basic rate of production is determined by the speed of operation of the feed table assembly 10, which feeds blanks in direct succession (that is, one blank directly after the other), without any space in between. Accordingly, to achieve a desired spacing between blanks, the blanks advantageously are directed from the feed table into a nip formed by a pair of pull-out rollers 50, 51 (FIG. 5). The pull-out rollers 50, 51 are arranged to grip the box blank between its principal surfaces and are driven at a predetermined higher speed, relative to the speed of the feed table assembly, such that the successive box blanks are drawn away from the feed table at a higher rate of speed than they are supplied. The speed relationship between the pull-out rollers and the feed table is adjustable, so that the desired spacing between successive blanks may be achieved, and the remainder of the machine is driven in synchronous relation to the pull-out rollers, so that the desired spacing is maintained throughout subsequent operations.

In the machine of the invention, a primary drive motor 52 (FIG. 2b) is arranged to drive a power shaft 53, which is connected through a gear box 54 (FIG. 2a)

to a drive input shaft 55 for the pull-out rollers 50, 51. The main power shaft 53 is also connected through a variable speed drive mechanism 56 (such as a "P.I.V.") and a gear box 57 to a shaft 58 forming the drive input for the driving drums 20, 26 of the feed table assembly. Thus, by appropriate adjustment of the variable speed mechanism 56, the speed of the feed table assembly 10 may be set at a predetermined lower level than the speed of operation of the pull-out rollers 50, 51, so that a desired spacing between blanks may be maintained, regardless of the size of the blank. In this respect, it will be understood that the provision of a two-inch spacing, when feeding blanks of six-inch length, requires that the feed table be operated at a much lower speed, relative to the pull-out rollers, than the maintenance of the same two-inch spacing between blanks of a twenty-inch length, for example.

In addition to the above-described variable speed relationship between the feed table assembly and the pull-out rollers, the machine of the invention incorporates a control clutch 59, actuated by a manual control lever 60 or other means, in the drive input system for the feed table assembly, such that the operation of the feed table may be stopped and started completely independently of the operation of the remainder of the machine. In this respect, the machine of the invention is intended for substantially universal application to a wide variety of sizes and shapes of box blanks and for relatively short production runs. Accordingly, it is contemplated that the machine frequently will be readjusted and rearranged for the accommodation of different box blanks. In the readjustment or "setup" operations, it normally is desirable to send a few test blanks through the machine, to make certain of the accuracy and correctness of the setup adjustments, and the control clutch 59 permits the feed table to be engaged momentarily, for the feeding of a single blank, so that its progress through the machine may be closely observed. The necessary final adjustments thus may be made with a minimum wastage of material, and costly and time-consuming "jam-ups" of box blanks are positively avoided.

The control clutch 59 also serves the additional important function of enabling the supply table to be stopped instantly in case of a jam-up at high speed. Moreover, it is not necessary, in such a case, to unload the supply table in order to run out the jammed-up blanks. In the course of a typical day's operations this can result in the saving of substantial amounts of time, as compared to operations with conventional machines.

In accordance with one of the specific features of the invention, the separate pull rollers 50, 51 are provided with separate input drives, taken from the input drive shaft 55. Thus, the bottom pull roller 51 is driven through a first set of belts 61, from a shaft 62, while the upper pull roller 50 is driven from a second set of belts 63, from a second shaft 64. The shafts 62, 64 are connected by gears 65 and, in accordance with the invention, either through the medium of the gears 65 or the connecting ratios of the respective belts 61, 63, or both, the upper pull roller 50 is arranged to be driven at a peripheral speed which is just slightly less than the peripheral speed of the lower pull roller 51. Specifically, the peripheral speed of the upper roller advantageously is about 98% of the peripheral speed of the lower roller.

In conjunction with the lower speed driving arrangement for the upper pull roller 50, and as another specific and significant feature of the invention, the drive input for the upper pull roller includes an overrunning clutch 66 (FIG. 2a). The overrunning clutch 66 which, per se, is a conventional, commercial item, is arranged to drive the upper pull roller 50 in a "forward" direction, while permitting the roller to "overrun" or rotate at a higher speed in the forward direction when driven from an external source.

When a box blank is fed from the supply table into the nip formed by the pull rollers 51, the blank is gripped firmly by the rollers, which are provided with resilient, deformable surface coverings 67, 68 (FIG. 5). As soon as the blank is thus gripped, it is driven positively in a forward direction by the lower pull roller 51 and, through the box blank itself, the upper pull roller 50 is accelerated from a "98%" speed to a "100%" speed, the slight acceleration of the upper roller being accommodated by the overrunning clutch 66.

The above-described novel drive arrangements for the pull rollers 50, 51 have been found to provide significantly improved control over the box blanks, relative to previous pull roller arrangements incorporating conventional drive means. Thus, when the box blank enters the pull roller nip, the resilient surface coverings 67, 68 are deformed, resulting in an effective change in the peripheral speed of the rollers. Where the upper and lower rollers are both driven positively, at normally equal peripheral speeds, the deformation of the surface layers will deflect the box blank, unless the deformation is exactly equal in both rollers, which is unlikely. Further, in the feeding of very short blanks, the slight "drag" exerted by the upper pull roller 50 tends, if anything, to deflect the box blank upward, in a way that counterbalances the tendency of the blank to tilt downward under its own weight, so that the leading edge of the box blank is reliably directed into the transport facilities of the machine, to be described subsequently. It will be understood, of course, that any tendency of the box blank to divert itself in a downward direction, by its own weight, may be significant in the handling of extremely short blanks.

Advantageously, the lower pull roller 51 is mounted for rotation about a fixed axis, by spaced journal blocks 69 (FIG. 5). The upper pull roll 50, on the other hand, is adjustably mounted in a way that the lowermost position of the roller may be adjustably fixed while upward movement of the roller, against the action of a spring, is provided for to accommodate the passage of a box blank between the rollers. To this end, the upper pull roller 50 is journaled at each end by a slide block 70, which is received in guides 71 for controlled vertical movement. Each slide block is positioned by a threaded shaft 72 having a square flange or collar 73 pinned thereto at its lower end which supports the slide block 70 against downward movement while permitting limited upward movement by reason of a small clearance space afforded by a "window" 74 formed in the top of the slide block.

The threaded shaft 72 is slidably received in a bushing 75 secured to a horizontal structure 76 of the machine frame, and the upper end of the shaft is threadedly engaged by a worm wheel 77 which bears on the frame section 76. The shaft 72 thus may be raised or lowered by appropriate rotation of the worm wheel 77, to raise or lower the slide block 70. A spring 78 bears downward on the slide block to keep the slide block normally pressed against the collar 73, while accommodating slight upward movement when a box blank passes between the pull rollers. The compression in the spring 78 may be approprately adjusted by manipulation of a nut 79 threaded on the bushing 75 and bearing against the upper end of the spring 78.

For simultaneous adjustment of slide block 70 at opposite sides of the machine, a control shaft 80 is provided which extends transversely across the machine and mounts worm gears 81 at each end. The control shaft 80 may be rotated by manipulation of a hand wheel 82 located at one side of the machine.

*Transport means*

The machine of the invention includes transport means arranged to receive box blanks from the pull-out rollers and to convey the box blanks and maintain control of them throughout the various operations involved in gluing and folding the blanks. Thus, with reference to FIGS. 1a, 1b, the machine includes three pairs of frame supports or stanchions 90-92 forming the principal support means for an elongated pair of longitudinally disposed lower pair of transport frames 93, 94, as well as a shorter pair of upper transport frames 95, 96.

Each of the stanchion pairs mounts a transversely disposed supporting bar 97 (FIG. 1a) for the slidable, transversely adjustable support of the lower transport frames 93, 94. In addition, at each stanchion pair, each of the lower transport frames is engaged by a transversely disposed, threaded control shaft 98 or 99. The arrangement is such that, by simultaneous operation of the control shafts 99 at each stanchion, the near side transport frame 93 may be adjusted inward and outward, with similar adjustment of the far side transport frame 94 being accomplished through simultaneous operation of the control shaft 98 at each stanchion.

The upper transport frames 95, 96 are supported from the stanchion pairs 90, 91, by means of transversely disposed supporting bars 100, 101 (FIG. 2a). The arrangement is such that the upper transport frames are adjustably movable inward and outward along with the lower transport frames.

Adjustable inward and outward control of the upper transport frames is provided by threaded control shafts 98', 99' (FIG. 2a) corresponding to the control shafts 98, 99 previously described.

From effecting proper inward and outward adjustment of the transport frames, all of the control shafts 99, 99' are mechanically or otherwise interconnected, as are the control shafts 98, 98', for movement in unison. Thus, for interconnecting the control shafts 98, 98', there is provided a longitudinally disposed power shaft 102 having a power take-off gear box 103 at each stanchion. The gear boxes 103 are connected in turn through transversely disposed shafts 104 to vertical shafts 105 (FIG. 1a) in the far side stanchions.

Through appropriate gearing, not specifically described, the vertical shafts 105 are connected to all three of the control shafts 98 and to both of the control shafts 98'. Similarly, the control shafts 99, 99' are mechanically interconnected by a power shaft 106, take-off gear boxes 107, transverse shafts 108, vertical shafts 109 and appropriate gear connections to all three of the control shafts 99 and both of the control shafts 99'.

Motorized driving power for transverse adjustment of the transport frames is provided by auxiliary drive motors 110, 111 (FIG. 2a), and the motors advantageously are provided with separate power systems, so that independent adjustment control is provided for the near side and far side transport frames.

The lower transport frames 93, 94 guide and support lower transport belts 112, 113 by means of appropriately placed supporting rollers 114, as well as guiding grooves provided along the upper edges of the frames. The belts travel in longitudinal grooves in the frames, until reaching the exit ends of the frames, where they pass over return pulleys 115, to be described subsequently.

The near side transport belt 112 is returned underneath the transport frame 93, being trained over a plurality of appropriately spaced guide pulleys 116 mounted by the frame, and around an elongated driving drum 117 mounted beneath the frame. Thus, while the guidance and support for the transport belt 112 is carried by and moves with the lower transport frame 93, the position of the driving drum 117 remains fixed, and driving contact with the drum in all adjusted positions of the frame is provided by accommodating transverse movement of the transport belt over the elongated driving surface of the drum. The far side transport belt 113 likewise is supported and guided by elements fixed to and movable with the transport frame 94, but makes driving engagement with a drum 118 which is fixed in position but is of elongated form to accommodate the belt 113 in any transversely adjusted position of the frame 94.

Figure 17:
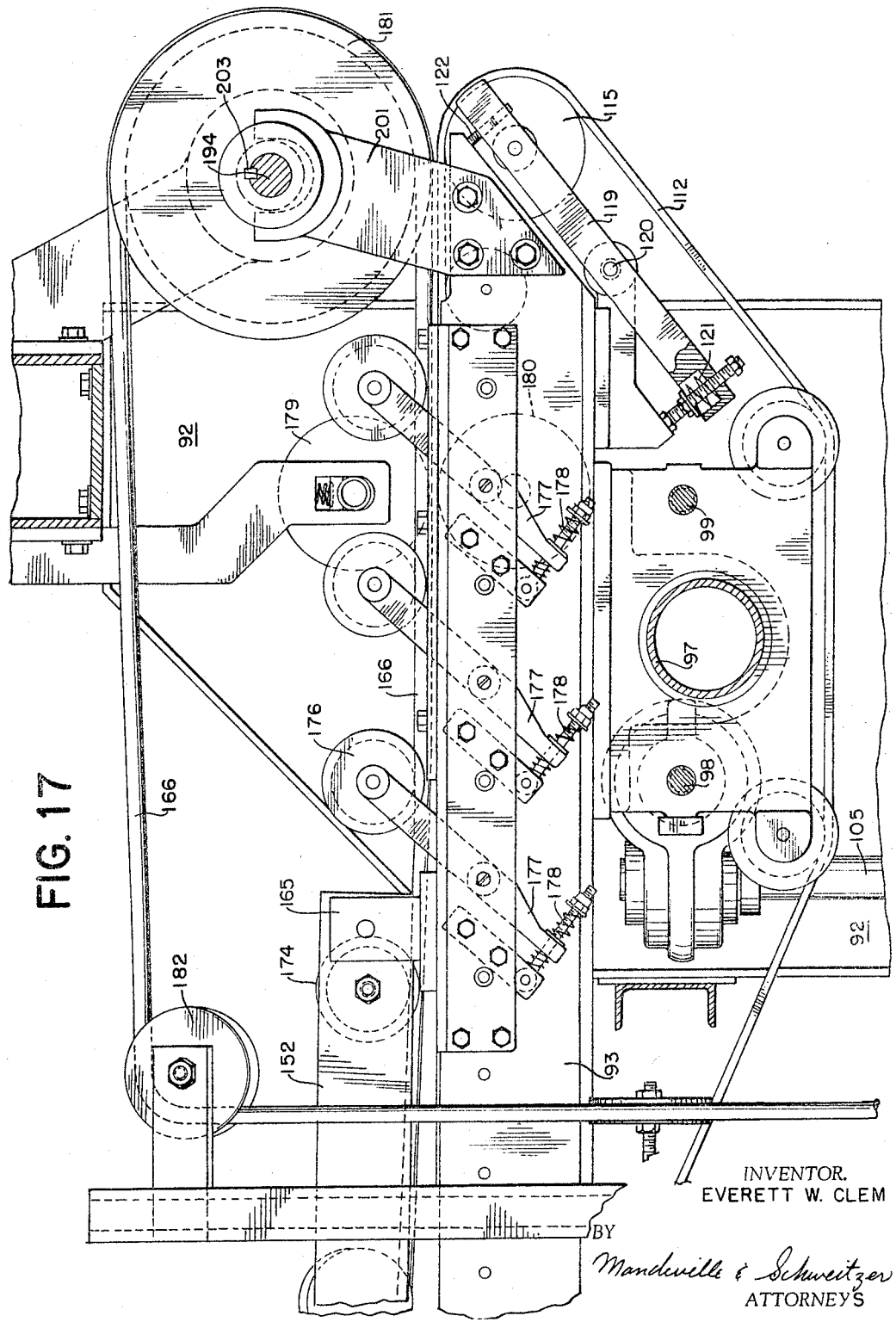
FIG. 17 is an enlarged fragmentary cross sectional view taken generally along line 17—17 of FIG. 2b and illustrating the discharge end of the new machine.

For purposes to be more fully described, the return pulleys 115 for the transport belts are journaled on pivot arms 119 (FIG. 17) mounted on the respective lower transport frames 93, 94 by means of pins 120. Adjustable springs 121 urge the return pulleys 115 in an upward direction, to limit positions determined by adjustable stop screws 122. The arrangement is such that the return pulleys 115 may be deflected downwardly during the discharge of a folded box blank from the machine.

As will be understood, during the last portion of a folding sequence, outer panels of the box blanks are being overfolded into flat relation to the central panels. Accordingly, the upper transport frames 95, 96, which lie above the transport plane in which the successive box blanks are conveyed, extend only over the first or upfolding portion of the machine. And, in the machine of the present invention, the upper transport frames also extend over a predetermined distance prior to the actual upfolding section, wherein certain preliminary operations are carried out on the box blank.

During the first transport stage, in which the upper and lower transport frames are cooperatively related, it is important to maintain the box blank under particularly firm, positive control, in order to maintain exact alignment. Accordingly, a pair of upper transport belts 123, 124 (FIG. 2a) are guided in the respective upper transport frames 95, 96, by means of a plurality of supporting rollers 125, the cooperatively related upper and lower transport belts being illustrated particularly in FIG. 1a.

For proper control gripping of different box blanks by the opposed sets of upper and lower transport belts, precise adjustment of the belt spacing is required. The present invention, as one of its specific features, provides novel and improved vertical adjustment facilities for the upper transport frames 95, 96, the improved facilities being illustrated particularly in FIGS. 1a, 7 and 8. Referring initially to FIG. 1a, it will be noted that each of the stanchion pairs 90, 91 supporting the upper transport frame is provided with a vertical adjustment mechanism generally designated by the reference numeral 126. Since the adjustment mechanisms for both stanchion pairs are the same, only one has been illustrated in detail in FIG. 1a, for the sake of simplicity.

Figure 7:
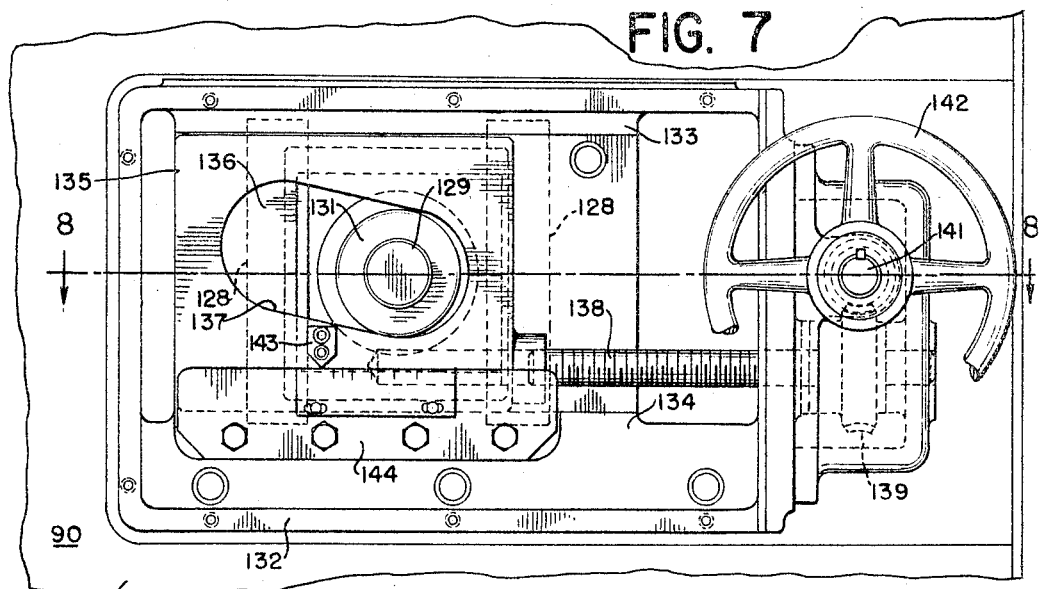
FIG. 7 is an enlarged, fragmentary view illustrating a novel and improved adjustment arrangement for the box blank transport facilities of the new machine.
Figure 8:
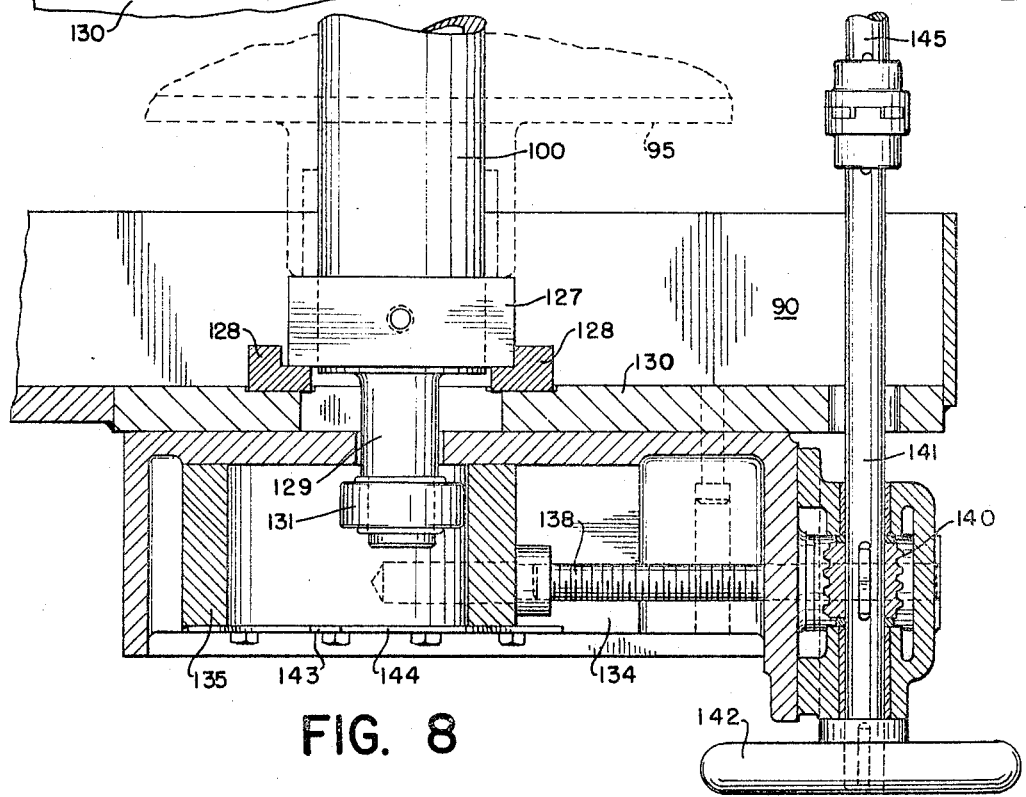
FIG. 8 is a fragmentary cross sectional view taken generally along line 8—8 of FIG. 7.

Referring now to FIGS. 7 and 8, the transverse supporting bar 100 is shown to be provided adjacent its ends with guide blocks 127, which are received in and guided for vertical movement by guide rails 128 mounted on the stanchion walls. The end extremities 129 of the supporting bar are of reduced diameter and project through the stanchion wall 130, mounting anti-friction rollers 131 at their free ends.

An adjusting frame 132 is suitably secured to the stanchion wall 130 at each side and forms opposed horizontally disposed guide tracks 133, 134 for receiving and guiding a cam block 135. As shown in FIG. 7, the cam block 135 is provided with a cam opening 136 which receives the anti-friction roller 131 and supports it on a slightly inclined lower cam surface 137.

At one side, the cam block 135 is threadedly engaged with a control shaft 138 driven through a worm wheel 139 and worm gear 140, the latter being keyed to a shaft 141 arranged for control manipulation by a hand wheel 142. Thus, upon appropriate manipulation of the hand wheel 142, the cam block 135 is shifted horizontally with respect to the axis of the transverse supporting bar 100, such that the bar is raised or lowered. By providing a substantial horizontal adjusting movement of the cam block 135, for effecting relatively small vertical adjustments of the supporting bar, substantial precision of adjustment is realized. Moreover, by providing an indicating pointer 143 on the cam block and a suitably graduated scale 144 on the adjustment frame (or vice versa), very precise indication of the adjusted condition of the apparatus is available to the operator.

Advantageously, adjustment of a supporting bar at its opposite supported ends is effected simultaneously, and this is accomplished by connecting the operating shafts 141 at each side of a stanchion, by means of an appropriate connecting shaft 145 (FIG. 8). In the illustrated apparatus, vertical adjustment of the upper transport frame is independent at each end. However, where desirable or expedient, the separate adjustment facilities may be mechanically or otherwise interconnected for simultaneous operation. Additionally, where desirable or expedient, the upper pull roller adjustment may be appropriately interconnected with the adjustment for the upper transport frame, so that a single correction will be required to adjust the upper transport belts and the upper pull rollers to accommodate blanks of a different thickness.

Figure 23:
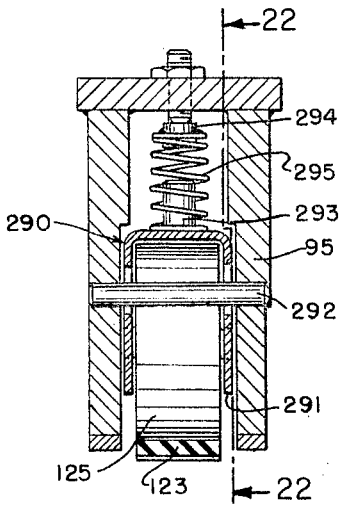
FIG. 23 is a cross sectional view taken on line 23—23 of FIG. 22.
Figure 22:
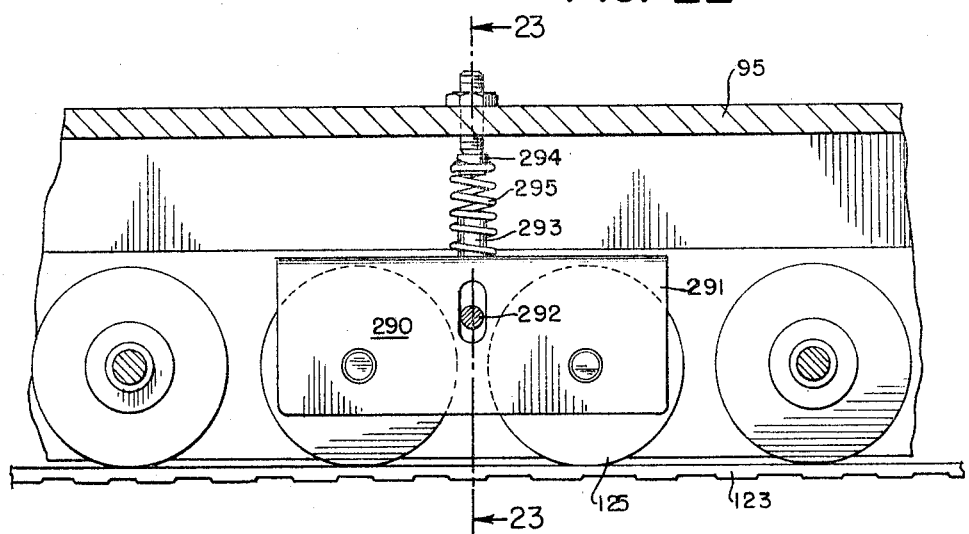
FIG. 22 is a fragmentary elevational view, partly in section, of an advantageous arrangement for driving upper transport belts of the apparatus of the invention.

In accordance with one aspect of the invention, novel and improved arrangements, illustrated in FIGS. 22, 23, are provided for assuring synchronous operation of the upper transport belts 123, 124 relative to their respective, cooperating lower transport belts 112, 113. Thus, the respective upper transport frames 95, 96 are provided at points, say, approximately half way between their ends, with traction roll assemblies, indicated generally at 290 in FIG. 22. Each traction roll assembly comprises a channel-like bracket 291 guided for vertical movement by the sides of the transport frame and by a transverse guide rod 292. The bracket 291 journals a pair of rollers 125 which overlie and support the upper transport belt 123 or 124.

A stud 293 projects upward from the traction roll bracket 291 and is aligned with the enlarged end of an adjusting screw 294 projecting downward from the upper wall of the transport frame. A compression spring 295 is secured to the adjusting screw and is received over the stud 293, to bear downward on the bracket 291 to urge the bracket, rolls and belt downward with a yielding force according to the setting of the screw 294.

When the lower transport belts 112, 113 are driven, but box blanks are not passing through the transport section of the machine, the traction roll brackets (typically one on each side) urge the upper belts 123, 124 down into contact with the driven lower belts, so that the upper belts are driven in synchronism therewith. Of course, when blanks are passing through the machine, the traction roll assemblies are deflected upwardly by the blanks, and the upper transport belts are sustained at the proper speed through the blanks themselves.

*Folding belt assembly*

As will be brought out in greater detail, box blanks carried through the machine by the transport belts are conveyed in the transport plane with their fold axes lying just outside the spaced transport frames. The foldable outer panels then are picked up by upwardly inclined and converging folding belts, which raise the panels into vertical positions. Thereafter, the folding belts are directed in a downward course, causing the panels to be overfolded into flat, overlapping relation. In accordance with one of the significant aspects of this invention, novel and improved folding belt arrangements are provided which impart wide flexibility to the machine and which permit the box panels to be maintained under complete control throughout the entire folding sequence.

Referring initially to FIGS. 1a and 1b and 2a, 2b, substantially identical folding belt assemblies are mounted at each side of the machine, supported by the respective lower transport frames 93, 94. Each folding belt assembly consists of three frame sections 150–152, which are pivotally connected to accommodate adjustment. The frames 150, constituting the up-folding portion of the assembly, are supported at their left hand end by outwardly extending, transverse supporting bars 153. The bars 153 are received slidably in collars 154, which permit slidable inward and outward adjustment of the respective frames 150, and suitable clamping means (not specifically shown) are provided for locking the frames in their adjusted positions. The adjustment for each side is independent, so that the adjusted positions of the respective frames 150 at each side may be different, as indicated in FIG. 2a, for example, for handling asymmetrical box blanks.

The front ends of the frame sections 150 are supported by adjustable racks or posts 155, which are carried by the transport frames 93, 94 and may be raised or lowered with respect thereto by means of hand wheels 156. The forward end of each of the frames 150 has a slotted connector 157 engaging the supporting post 155 by means of a hand operated nut and bolt assembly 158, which is loosened for adjustment and thereafter tightened. The slotted connector 157 accommodates adjustable movement of the frame section 150 from a near horizontal position to a substantially elevated position with the supporting post 155 fully extended, it being understood that the supporting bars 153 at the opposite ends of the frame sections constitute fixed pivot axes.

As shown best in FIG. 14, the slotted connectors 157 are pivotally connected to the frame sections 150 by bolts 159, to accommodate inward and outward adjusting movements of the rearward or left hand ends of the frame sections 150.

The intermediate frame sections 151 have slotted end portions engaged with the adjustable supporting post 155 by means of the nut and bolt assemblies 158. The forward ends of the frame sections 151 are pivotally connected to the respective transport frames 93, 94 by means of connectors 161 mounted for limited vertical adjustment by means of threaded posts 162 and hand nuts 163, the latter being mounted in brackets 164 fixed to the transport frames. Thus, the intermediate folding belt frame sections 151 are mounted to accommodate substantial vertical adjustment of their rearward ends and limited vertical adjustment of their forward ends. However, angular adjustment of the frame sections 151 with respect to the longitudinal axis of the machine has been found to be unnecessary, and no provision therefore has been made.

The forward frame sections 152 of the folding belt asemblies are connected at their rearward ends by the adjustable connectors 161, while the forward ends are pivotally connected to brackets 165 (FIG. 1b) fixed to the respective lower transport frames 93, 94.

As one of the significant features of the invention, the folding belt assemblies are so arranged as to carry out the folding sequence in a controlled manner, heretofore not obtainable, such that, particularly in the "flat folding" portion of the folding sequence, when the panels are folded from vertical positions into flat, overfolded positions, the moving box blank is kept under full control. In contrast, in previous machines of which I am aware, the overfolding portion of the folding sequence has been characterized by excessively rapid and generally uncontrolled movement of the panels, at least during the last portion of the fold, resulting in the creation of significant windage forces, which can and often do cause the box blanks to become misaligned in the machine, as well as causing undesirable spread of the glue.

In the machine of the invention, upfolding of the box panels occurs as the blanks advance to the adjustable supporting posts 155. Thus, each of the folding belt assemblies trains a folding belt 166 which, during the upfold or vertical fold operations, is guided to travel from starting point below the transport plane and near the outer edges of a flat box blank to a "final" position in the vertical fold sequence, in which the folding belts are positioned generally vertically above the folding creases of the box blank, at an appropriately adjusted height to engage the narrow vertical panels at points, say, midway between the crease lines and the free edges of the panels. During this upfolding sequence, the central body of the blank is held firmly on the lower transport belts 112, 113 by means of elongated, forwardly extending "swords" 167 secured to the upper transport frames 95, 96. Advantageously, the swords 167 extend well into the flat-folding portion of the folding sequence (see FIG. 2b), so that proper control over the blank is maintained as long as possible.

Advantageously, the function of the swords may be supplemented by the application of suction through or adjacent the lower transport belts 112, 113. To this end, provisions may be made for applying belt suction from a point adjacent the ends of the swords 167 to a point adjacent the terminal ends of the lower transport belts or, if desirable or expedient, suction could commence from a point adjacent the terminal ends of the upper transport belts 123, 124, which would permit a reduction in the length of the swords.

Thus, as indicated in FIG. 19, the lower transport frames 93, 94 may be in the form of U-shaped channels, with the lower transport belts 112, 113 being supported by rollers 114 at the top of the channel in such manner as to substantially seal the interior thereof. The lower transport belts are suitably perforated, and suction is applied to the interior of the channels over the operative length mentioned above. Thus, box blanks being conveyed over the lower transport frames are gripped initially between the sets of upper and lower transport belts, then between the swords and the lower transport belts, and subsequently by the application of suction through the lower transport belts. And, where desired, the belt suction may be employed over all or a substantial portion of the lengthwise extent of the swords, to improve control over the box blank and/or to accommodate a reduction in the length of the swords.

Training and guiding of the folding belts 166 during the vertical fold sequence is accomplished by means of a return pulley 168, at the left hand end of each of the frame sections 150, and by a plurality of spaced guide pulleys 169 mounted on the frames 150 and oriented in a predetermined manner such that the axis of rotation of each guide pulley is substantially parallel to the plane of the box panel, as the blank travels by the pulley. Advantageously, the guide pulleys 169 are mounted on the frames 150 by means of axle rods 170 (see FIG. 15) secured to the frames 150 and bent at appropriate angles to support the guide pulley in perpendicular relation to the box panel.

In accordance with one aspect of the invention, the flat folding portion of the folding sequence is accomplished in such a manner that a uniform number of degrees of folding, from the vertical toward the horizontal, is carried out during each uniform increment of linear advance of the box blank. Theoretically, this would require that the folding belts be guided in a complex, mathematical curve, which would have to be calculated for each size and shape of panel. However, I have discovered that the desired theoretical result may be approximated to a surprisingly close degree by carrying out the flat folding operation in two stages, which appear to be quite distinct from the standpoint of the equipment employed but actually constitute one continuous, unform folding sequence, in terms of the result obtained.

Referring specifically to FIGS. 1b and 14, the flat folding section includes a first group of three guide pulleys 171 secured to the frame sections 151 by means of appropriately bent axle rods 172. The folding belts 166, after passing over idler pulleys 173 on the adjustable supporting posts 155, are guided downward and slightly inward by the three guide pulleys 171, urging the box panels inward to fold through an angle of approximately 9° as the box blank advances longitudinally from one guide pulley to the other. Advantageously, the supporting rods 172 for the three guide pulleys 171 are arranged to keep the respective guide pulleys in perpendicular relation to the box panels.

As will be understood, in the "first stage" of the flat folding sequence, the panel is folded through an angle of about 27°. In the folding of a relatively large panel, for which the adjustable post 155 is raised to a relatively high position, the folding belts 166 are angled sharply downward during the 27° of "first stage" folding; the belts will be directed less sharply downward in the case of smaller panels, in order to maintain a close approximation of the theoretically desired, complex folding curve.

After passing around an idler pulley 173a, which accommodates a sharp change in direction of the belt, each folding belt is guided by a group of seven guide pulleys 174 mounted on the frame sections 152, by means of bent axle rods 175. The guide pulleys 174 direct the folding belts in a downwardly angled course, on a very gradual basis. At the same time, the folding belts are directed longitudinally, over the transport belts and a short distance inside the folding creases of the box blank. The arrangement is such that, during the last portion of the flat folding sequence, the box blank is gripped near its edges between the lower transport belts 112, 113 and the respective folding belts 166.

In accordance with the invention, during each of the seven substantially uniform linear increments represented by the spacing of the guide pulleys 174, the folding belts 166 are so guided as to cause approximately 9° of folding, toward the horizontal, of the box panel. The arrangement is such that the folding is complete when the blank passes under the last of the guide pulleys 174, which are positioned adjacent the pivot brackets 165 for the guide frames 152.

The folding frame assembly of the present invention has significant advantages, with particular regard to the two section construction of the assembly for the flat folding sequence. This arrangement permits substantial approximation of a theoretically desirable, complex guide curve for the folding belts and, at the same time, accommodates easy adjustment of the mechanism for the handling of box blanks of various types and sizes.

After passing under the last of the guide pulleys 174, the folding belts 166 pass under a succession of three spring mounted pressure pulleys 176, mounted on pivot arms 177 and urged by adjustable springs 178 to press the folding belts 166 downward, to grip the folded box blank firmly between the folding belts 166 and the respective lower transport belts 112, 113. The folded box blank is conveyed forward, while thus gripped, between a pair of pressure rollers 179, 180, which press upon overlapped margins of the folded panels to secure the panels together with glue previously applied thereto, as will be described. The folded and glued boxes are thereupon discharged between return pulleys 181 for the folding belts and return pulleys 115 for the lower transport belts, the resilient mounting of the last-mentioned return pulleys permitting the boxes to be discharged in a desired manner onto suitable conveying equipment (not shown).

As indicated particularly in FIG. 1b, the folding belts 166 pass upward and around the return pulleys 181, around idler pulleys 182, weighted tension pulleys 183, and idler pulleys 184–186, to the return pulleys 168 at the left hand end of the folding belt assembly. The weighted tension pulleys 183 are vertically movable and serve to maintain the folding belts under constant, predetermined tension in the various adjusted conditions of the folding belt assemblies.

*Adjustable drive system*

In the operation of the folding belt and transport belt systems, advantageous accommodations are made for independent variation of the speeds of all of the individual belts. Thus, as will be understood, in the handling of a box blank having a large folding panel at one side and a small folding panel at the other side, the respective folding belts 166, when properly adjusted, will have to travel at different speeds, so that the folding belts will not tend to advance, retard or skew the box blank being advanced by the transport belts. Likewise, it has been found to be highly advantageous to provide for the independent speed adjustment of the transport belts 112, 113. While, seemingly, these two belts should be driven at the same speed, a limited range of speed adjustment, of one belt relative to the other, is usable to great advantage in the processing of asymmetrical box blanks where, for one reason or another, one side of the box may tend to lag or lead the other.

In the apparatus of the invention, the basic machine speed is controlled by variation of the speed of the drive motor 52, and the far side, lower transport belt 113 is driven directly at "machine speed" through a power takeoff shaft 190 and a drive belt 191 connected to the driving drum 118. The driving drum 117, for the near side lower transport belt 112, is driven from the shaft 190, through a belt 192 and an adjustable drive assembly 193. Thus, by appropriate manipulation of the variable drive 193, the speed of the transport belt 112 may be varied through a limited range, above or below "machine speed" at which the belt 113 is driven. The respective upper transport belts 123, 124, being driven through by the lower belts, through the mechanisms of FIGS. 22 and 23, and through interposed box blanks, operate at speeds corresponding to the respective speeds of the lower transport belts.

The individual folding belts are driven through separately adjustable drives, whereby the speeds of the folding belts may be varied relatively and also with respect to the machine speed. Thus, referring to FIG. 2b and FIG. 18, the return pulley 181 for the near side folding belt is slidably keyed to a quill shaft 194 journaled in the stanchion assembly 93. The quill shaft is driven at one end through a system including a drive pulley 195 and a variable drive assembly 196 connected to a power take-off shaft 197.

The return pulley 181 for the far side folding belt is slidably keyed to a tube shaft 198, which surrounds the quill shaft 194 and extends only to the center of the machine, being journaled in the stanchion assembly 92. The tube shaft 198 is driven through a system including a drive belt 199 and an adjustable drive assembly 200, connected to the power take-off shaft 197.

By appropriate manipulation of the variable speed assemblies 196, 200, the quill and tube shafts 194, 198 may be adjusted independently with respect to the machine speed and, of course, with respect to each other.

As shown in FIG. 18, the return (and drive input) pulleys 181 for the folding belts are engaged by shifting brackets 201, 202 carried by the respective transport frames 93, 94. Accordingly, as the transport frames are adjusted inward and outward, the return pulleys 181 are slidably moved along their quill or tube shafts, while being retained in proper alignment with respect to the transport belts 112, 113. The return pulleys remain locked for rotation with the shafts, however, by means of keys 203.

*Pre-wetting*

In accordance with certain more specific aspects of the invention, box blanks advanced through the machine for folding and gluing are given certain advantageous preliminary treatments to assist in and improve the performance of the actual folding operations. One such preliminary treatment resides in the pre-wetting of the box blanks along predetermined, limited longitudinal areas in the immediate region of and including the crease lines about which the blank is to be folded.

The machine of the invention is designed primarily for the folding of corrugated box blanks, which often have substantial thickness. Accordingly, when the box board material is folded from a flat, open condition, to a flat, overfolded condition, the fibers of the material, along the crease, are heavily strained and, following past practices, occasionally rupture. This is avoided, in accordance with the invention, by moistening the board in the regions of the crease lines, to soften and lubricate the fibers, permitting them to stretch sufficiently to accommodate the fold without rupturing.

The pre-wetting facilities, illustrated particularly in FIGS. 5 and 6, advantageously include liquid reservoirs 210 located below the transport plane, just outside the axes of the lower transport belts 112, 113. Advantageously, the reservoirs 210 are located between the pull-out rollers 50, 51 and the transport belts, substantially as shown in FIG. 5.

The reservoirs 210 are maintained filled to a predetermined level by a suitable control facility (not shown) with a treating liquid, which advantageously is watered with a small percentage of surfactant to reduce surface tension and improved penetration. An applicator element 211, similar to the head of a paint brush, for example, is mounted within the liquid-retaining body of the reservoir, with its free end projecting upward, through the transport plane, advantageously inclined in the direction of advancement of the blanks. A back-up roller 212 is positioned over the reservoir and above the transport plane, to ride on the top surface of a blank and prevent its being deflected upwardly by the applicator 211.

As a blank travels between the pull-out rollers and the transport belts, the applicator 211 wipes along the bottom surface of the blank to apply the treating liquid to a longitudinal strip of the blank (e.g. one inch in width), advantageously centered on the crease line. The treating liquid penetrates and softens the fibers to facilitate subsequent folding.

When the trailing edge of the blank passes the applicator 211, the bristles thereof spring upward into the available open space, and a suitable shield plate 213 is mounted above the applicator to intercept any liquid spray from this occurrence and permit it to drain back into the reservoir 210.

The described form of pre-wetting facility is particularly advantageous because of its inherent simplicity, its substantial effectiveness and because of the fact that it operates only upon the passage of a box blank, as distinguished from a spray device, for example, which requires collection and return of the spray when no box blank is above the nozzle.

When employing the pre-wetting applicator just described, for pre-wetting areas of the bottom of the box blank, it is convenient, if desirable or expedient to pre-wet top areas of the box blanks also, to employ spray means, for example, for that purpose. Thus, whereas a spray applicator for the bottom surface of a box blank presents significant problems, a top spray applicator, such as indicated at 214 in FIG. 5, is conveniently and advantageously used when positioned directly above the reservoir 210 of the previously described applicator unit. When no box blank is passing through the applicator, the spray material is directed into the reservoir 210, which may have an appropriate overflow arrangement (not shown) to carry off excess liquid, if necessary. Wetting the top or inside fold areas softens the sheet, so that it can be more easily compacted. This reduces the tendency of the folded blank to spring back and minimizes build-up of board material along the inside of the fold.

*Refresher scoring*

An additional preliminary treatment, constituting one aspect of the invention, resides in the so-called "refresher scoring" of the box blank and, where necessary or expedient, crushing the blank along the creases. Thus, corrugated board box blanks, while normally being cut and scored in connection with the blanking operation, often lose much of their scoring through aging. When, as often is the case, box blanks are folded many weeks after scoring, the original score lines may be poorly defined, and the resulting fold may be irregular. This is avoided, in accordance with the present invention, by rescoring the successive blanks, as they are transported through the machine, to "refresh" the original scoring.

The refresher scoring means of the invention constitute an assembly, mounted on each of the transport frames and consisting of a pair of rescoring wheels and adjustable mounting means therefor. Referring particularly to FIGS. 5 and 9, an upper rescoring wheel 220 is mounted on a supporting arm 221, by means of an adjustable assembly, including an axle stud 222. The axle stud has a threaded outer end portion 223 engaging a threaded boss 225 mounted on the arm 221 and receiving a lock nut 224. Thus, by adjusting the threaded axle stud, and securing with the nut 224, the rescoring wheel 220 can be adjusted inward and outward through a limited range of adjustment with respect to the upper transport frame 95. By this means, the line of refresher scoring, determined by a circular disk 227 forming an annular ridge on the rescoring wheel, may be aligned in a predetermined, precise relationship with "straight edges" 228 (see FIG. 12) which are carried by the upper transport frames and serve as edges about which the box blanks are folded during the upfolding stage. In this respect, it usually is desirable and advantageous to so adjust the equipment that the straight edges 228 are offset inward from the score lines (and hence from the ridges of the rescoring wheels), substantially as shown in FIG. 26, since this has been found to promote proper folding. Normally, the straight edges are offset inward a distance on the order of ⅛ to ¼ inch, depending on blank thickness, etc.

In order to control the depth of the refresher scoring, provisions are made for raising and lowering the upper score wheel 220 through a limited range of adjustment. To this end, the supporting arm 221 is pivoted on the upper transport frame, by means of a bolt 228, and the other end of the supporting arm is provided with an elongated slot 229 for cooperation with an eccentric 230. The rotative position of the eccentric 230 is determined by means of a manually operated lever 231 fixed to a shaft 232 on which the eccentric is mounted, permitting the rescoring wheel 220 to be raised and lowered by manipulation of the lever 231, which is then fixed in its adjusted position by means of a lock nut 233.

The lower rescoring wheel 234 of each set is mounted on the lower transport frame, as by means of a plate bracket 235. Provisions for vertical adjustment of the lower rescoring wheel are not necessary, although lateral adjustment may be provided, by means of an adjustable mounting 236, similar to that described above, where the respective rescoring wheels have related profiles which require that the wheels be accurately aligned with respect to each other.

One advantageous form of rescoring wheel pair is shown in FIG. 10. In the illustrated wheel pair, the upper rescoring wheel 220 is provided with a circumferential rib formed by a disk 227, which presses into the box blank, to a depth determined by shoulders 237 defined by the body of the wheel. The lower rescoring wheel 234 simply provides a flat, anvil surface against which the upper rescoring wheel works.

In conjunction with the rescoring operation, it frequently is desirable to pre-break and partially fold the box blank, preliminary to the principal folding operations. In such instances, the apparatus incorporates a second set of wheels, immediately following the rescoring wheels, as indicated at the righthand side of FIG. 20. The pre-break wheels, indicated in cross section in FIG. 11, include an upper wheel 220a provided with a circumferential ridge 227a, the upper wheel being adjustable inward and outward with respect to the upper transport frame 95 by a mechanism similar to that shown in FIG. 9. A cooperating lower wheel 234a is provided with a circumferential groove 238 arranged for cooperation with the ridge 227a. The lower wheel 234a advantageously is in the form of a threaded ring and is received over the threaded boss 114b of a modified lower belt-supporting roller 114a, such that the lower wheel can be adjusted inward and outward with respect to the lower transport frame by rotation of the wheel relative to the roller 114a. The wheel is locked in its adjusted position by one or more locking screws 234b.

Figure 21:
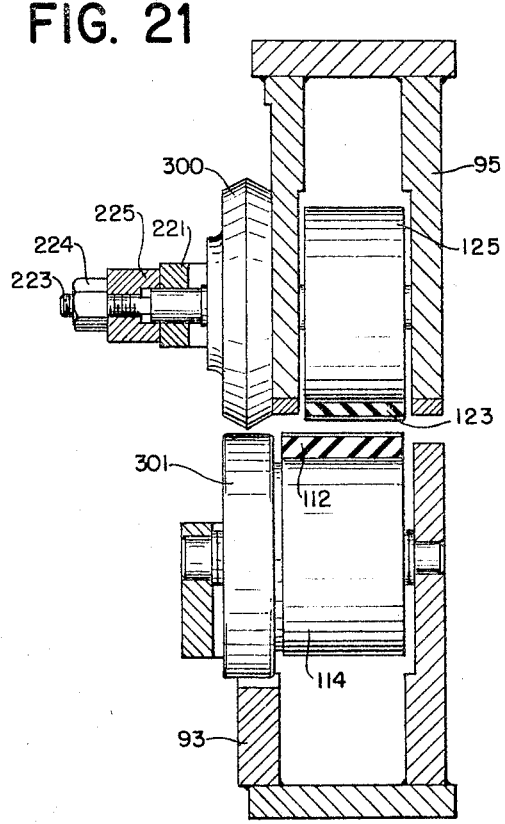
FIG. 21 is a cross sectional view taken along line 21—21 of FIG. 20.

The wheel pair shown in FIG. 11 advantageously provides about 10° to 15° of folding of the blank, from the flat condition, so that the blank is "pre-broken" along the crease to facilitate commencement of the regular folding operations. This is particularly desirable where the corrugations of the box blank extend transversely of the crease line.

Where the box blank is of substantial thickness, it is advantageous to employ a pair of crushing wheels, usually in place of the pre-break wheels 220a, 234a. An advantageous form of crushing wheels is shown in FIG. 21, in which an upper crushing wheel 300 is adjustably mounted on the upper transport frame 95, substantially in the manner described with reference to the upper rescoring wheel 220. The outer periphery of the crushing wheel is of V-shaped configuration and is arranged to form a V-shaped indentation in the box blank, with the apex of the V lying substantially along the crease line of the blank. The lower wheel 301 may have a substantially cylindrical working surface and serves as an anvil, against which the crushing wheel 300 works.

As shown particularly in FIGS. 27–30, the rescoring wheel alone may not make a sufficient impression in a box blank of substantial thickness to accommodate a 180° fold of the blank without undue distortions. FIG. 27 indicates the cross section of a heavy box blank after passing under the rescoring wheel to "refresh" the original score and slightly impress the margins of the blank adjacent the actual crease line. However, in a particularly heavy box blank, there is still a substantial space between the upper and lower surfaces of the blank such that, when the blank is folded through 180°, bulging of the inner surface of the blank occurs in the areas immediately adjacent the crease, substantially as indicated in FIG. 30. In accordance with the invention, the rescored box blank may be passed through the crushing wheels 300, 301 to form a deep, V-shaped impression in the blank and substantially reduce the thickness thereof in the immediate regions of the crease line. When the crushed blank subsequently is folded through 180°, bulging of the blank in the region of the crease, and the accompanying tendency for the blank to "spring back," is reduced significantly, as indicated in FIG. 29.

*Gluing*

After the box blanks are engaged by the transport belts and while the blanks still are in flat condition, glue is applied to a marginal edge portion of one flap (or to a glue tab) so that, when the flaps are flat-folded into overlapping relation, they overlap along the glued area. Typically, glue is applied to the lower surface of one flap, so that the glue strip faces upwardly when the glued flap is folded over.

Figure 13:
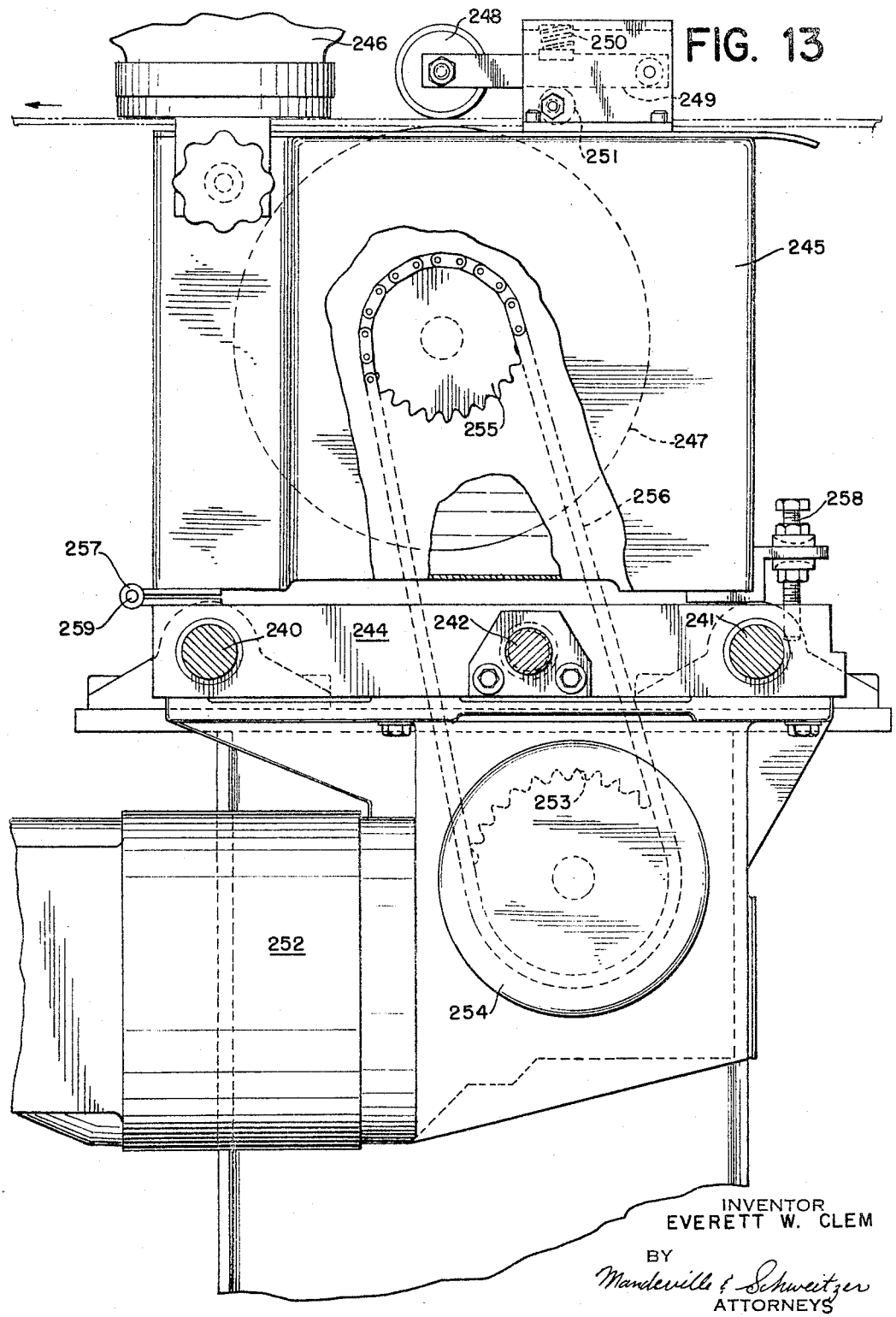
FIG. 13 is an enlarged, fragmentary cross sectional view taken generally along line 13—13 of FIG. 2a and illustrating an advantageous form of glue applying apparatus incorporated in the machine of the invention.

The glue applicator of the present apparatus, shown best in FIGS. 2a and 13, includes an adjustable support formed by a pair of spaced rods 240, 241, and a threaded shaft 242 operated by a hand wheel 243. The gluer frame, generally indicated by the reference numeral 244, slides on the rods 240, 241 and is engaged by the threaded shaft 242, enabling the gluer to be moved inward and outward, as a unit, by manipulation of the hand wheel 243, to line up the glue applicator with the desired edge margin of the box blank.

The glue applicator consists of a reservoir tank 245, supplied from a removable container 246 and arranged to maintain the glue at a predetermined level with respect to a glue wheel 247, journaled for rotation within the reservoir. A portion of the glue wheel is exposed above the top surface of the reservoir, in position to make contact with the bottom surface of a box blank being transported over the top surface of the reservoir, and a back-up wheel 248 is positioned just above the glue wheel for engagement with the top surface of a blank, to hold it in desired engagement with the glue wheel. The back-up wheel 248 is adjustably mounted as by a pivoting arm 249 urged downward by a spring 250 to a limit position above the wheel, as determined by an adjustable cam 251.

The glue wheel 247 is driven by a motor and gear drive assembly 252 suspended from the gluer frame and driving a sprocket 253 through an adjustable safety slip clutch 254. The glue wheel 247 is fixed to a driven sprocket 255 connected to the main driving sprocket 253 by a suitable chain 256.

The glue reservoir 245 advantageously is connected to the gluer frame 244 by means of a hinge 257 at one side and an adjustable bolt 258 at the other. This arrangement not only provides for proper tensioning of the chain, but greatly facilitates removal of the entire upper portion of the gluer, for cleaning, etc., simply by removing the hinge pin 259 and disconnecting the chain 256.

Advantageously, the gluer drive motor 252 is electrically interconnected with the main drive motor 52, through conventional control facilities (not shown) whereby the speed of operation of the gluer drive motor 252 follows the machine speed, although being adjustable slightly above or below the machine speed to provide for a slight "wiping" action between the glue wheel and the advancing box blank. The electrical control for the gluer motor also advantageously includes conventional control circuit arrangements providing a minimum "idling" speed for the gluer motor such that, when the machine as a whole is shut down, the gluer will continue to operate at a minimum speed to prevent freezing of the glue wheel.

*Pre-break*

In accordance with another aspect of the invention, the folder gluer apparatus may include, as an optional feature, pre-break facilities arranged to "break" the box blank along the crease by means of a sharp impact imparted to the foldable panels. For this purpose, a pair of linear actuators 260, 261 (FIGS. 1a, 2a and 12) are adjustably mounted on the lower transport frames, with their actuating plungers 262 positioned normally below the transport plane. The actuators, which are electrically operated, are controlled by suitable means, such as photoelectric cell or switch 263, arranged to sense the passage, past a certain point, of the leading edge of a box blank. The arrangement is such that tripping of the switches 263 energizes the actuators to drive the plungers 262 thereof upward, through the transport plane, engaging the foldable box panels with substantial impact, and "breaking" the panels along their crease lines, about the straight edge 228.

The linear actuators 260, 261 are adjustably mounted on brackets 264, for inward and outward movement with respect to the lower transport frames, and the brackets 264 are, in turn, adjustably mounted on the transport frames for longitudinal adjustment. By appropriate adjustment, the actuators may be so located as to position the plungers 262 under the respective centers of percussion of the box flaps, when the leading edge portions of the blank at each side engage the control switches 263.

For most types of box blanks, a pre-break operation is not necessary. However, in certain special types of box blank configuration, where the length of the flap may be great in relation to the length of the crease line by which it is connected to the body of the blank, a pre-break operation may be particularly desirable in order to fracture any accumulation of relatively rigid adhesive within the corrugated structure and to assure that the folding operation commences properly.

*Line-up indicator*

One of the important preparatory operations in the set-up of a box folding machine resides in the initial line-up of the transport frames (and the pre-wetting, refresher scoring, folding and other equipment carried thereby) so that the various manipulative operations carried out on the box blank are properly related to the folding scores formed on the blank. Heretofore, this has been a time-consuming and difficult trial-and-error type of operation. However, in accordance with one of the specific aspects of the invention, novel and improved indicator arrangements are provided which permit the transport frames on each side (together with the related moistener and refresher score means, folding swords, flat fold section, etc.) to be individually aligned quickly and with substantial precision with respect to the crease line of the box blank about which the folding operations are to occur.

As shown best in FIGS. 3, 5 and 6, the indicator means of the invention includes, in association with the transport frames at each side, an indicating pointer 270 having a flat, pointed end 271, formed of transparent material, such as Plexiglas and projecting over the feed table and adapted directly to overlie a box blank 21a supported in feeding position on the table. The pointer element 270 is pivotally connected at 272 to a mounting bracket 273 secured to the upper transport frame 95 or 96 by bolts 274. The configuration of the mounting bracket 273 is such, in relation to the configuration of the pointer element 270 and its pivot axis 272 that, when the pointer element is pivoted upward to the position shown in broken lines in FIG. 5, it will rest against the bracket by the force of gravity, in an out-of-the-way position. For a line-up operation, however, the pointer is swung downward to rest directly upon a single box blank supported on the feed table and the operator then may line up the pointer precisely with the actual cuts and creases on the box blank, by appropriate inward and outward adjustment of the transport frames. The operation is simple, swift and extremely accurate, and represents a significant improvement over line-up practices heretofore carried out.

Although it is not absolutely necessary to form the indicating pointers of transparent material, it is desirable to do so since it permits the operator to align the pointers more easily. Further, it is advantageous to inscribe the pointer with two or three calibration lines, since in some instances it is desirable to position the pointers in slightly offset relation to the original crease lines, and the various described calibrations, indicated at 276 in FIG. 6, greatly facilitate such adjustment. Typically, the pointer elements 270 may be offset slightly to the outside of the straight edges 228 so that, when the pointers are exactly aligned with the creases of the box blank, the creases are properly aligned (offset outward about ⅛ to ¼ inch) with the straight edges about which the box subsequently will be folded.

The improved line-up facilities enable significant reduction in line-up time to be realized and, moreover, assure greater precision of the final settings of the machine.

One of the significant, advantageous features of the invention resides in the fact that the pre-wetting, refresher scoring, crushing, and pre-breaking facilities are all mounted on and carried by transport frames. Accordingly, when the transport frames are properly aligned relative to the crease lines of the box blank, through the use of the pointer elements 270, the various operative stations simultaneously are brought into proper alignment. Heretofore, many of the various operative stations provided in a folding apparatus have required separate adjustment, which has resulted in significantly increased time requirements for set-up operations.

*Summary of operation*

In setting up the machine for operation with box blanks of a particular size and shape, a blank is first laid on the feed table and the side guides 36 are adjusted inward into confining relation to the side edges of the blank. The blank need not be accurately centered on the feed table, but advantageously is approximately centered by eye. The stops 37 are then adjusted vertically, by manipulation of the hand wheel 40, until the clearance space below the front stops are just sufficient to allow one box blank at a time to be advanced by the feed table.

With a single box blank held on the feed table between the side guides 36, the line-up pointers 270 are pivoted forward to rest on the blank, and the respective near-side and far-side transport frames are adjusted laterally, through the motors 110, 111, until the pointers are properly aligned with the crease lines about which the box is to be folded. The transport belts are driven during the adjustment to accommodate proper movement thereof relative to the driving drums 117, 118. Adjustment of the transport frames also is made, through manipulation of the hand wheels 142, to provide the desired amount of vertical separation between the transport belts for the particular thickness of box blank. Likewise, the re-scoring and crushing wheels are properly adjusted for depth of the refresher score, as well as for lateral location of the refresher scoring with respect to the straight edges 228. Once established, the lateral adjustment of the score wheels is substantially permanent, unless the nature of the blanks to be processed changes quite significantly. If employed, the pre-break actuators are adjusted laterally and longitudinally if necessary with respect to their actuating switches 263, so that the actuating plungers are located approximately beneath the centers of percussion of the folding flaps, when the switches are tripped by the leading edge portions of a box blank being conveyed along the transport plane.

After a proper line-up of the transport frames, the respective folding belt assemblies are adjusted individually, preferably while the main drive motor is running, so that, in the upfolding section of the machine, the foldable panels are engaged near their outer edges by the upwardly and inwardly guided folding belts 166. Vertical adjustment of the supporting post 155 is then made so that the folding belts, at their highest points of travel, engage the then vertical panels of the box blank at a predetermined height, for example, about half-way between the crease and the free edge of the panel. It will be understood this may involve radically different adjustment at each side of the machine, in cases where the panels are of substantially different size. A corresponding vertical adjustment likewise is made with respect to the supporting connectors 162 at each side, so that a proper "knee" is formed by the folding frame sections 151, 152.

For a symmetrical box blank, the various speed adjustments will be made such that, normally, the transport belt at both sides operate at the same speed (i.e., machine speed). The folding belts likewise will be adjusted to operate at similar speeds, but somewhat above the machine speed level to take into account the fact that the folding belts travel through a non-linear path. In the case of asymmetrical blanks, the folding belt associated with the larger foldable panel normally will have to be adjusted to travel at a higher speed, and correcting speed adjustments may have to be made with respect to the transport belt 112 to correct for any tendency for an asymmetrical blank to become misaligned in the machine.

After the making of initial, preliminary adjustments throughout the machine, the main drive motor 52 may be energized and set at a desired machine speed, keeping the feed table deactivated, by disengaging the clutch 59. Thereafter, the clutch may be momentarily engaged, to feed a single blank through the pull rollers and into gripping relation to the transport belts, to be conveyed to the machine. The single blank thus passes through the full sequence of operations, under the close observance of the operator, to make certain the machine is functioning properly in all respects. If any malfunction is observed, through improper adjustment, or otherwise an appropriate correction can be made with an absolute minimum of scrappage of blanks and without any danger of the machine jamming through pile-up of a succession of blanks. Once the machine is operating satisfactorily, on the basis of sending blanks through one at a time, the clutch 59 may be permanently engaged to feed blanks in steady succession, a desired spacing between successive blanks being established by adjustment of the variable speed transmission 56 to cause the feed table to operate at a predetermined slower speed than the machine speed.

The new machine incorporates a large number of significantly improved features which individually and cooperatively provide greatly improved efficiency in the folding of box blanks of a wide variety of sizes and shapes. The new machine is intended particularly for "jobbing" type operations involving relatively small runs of a variety of box blanks. In such operations, wide versatility of the machine is imperative, and extraordinary efficiency in set-up operations is needed to enable profitable use to be made of a machine. The machine of the invention, while incorporating a wide variety of independently adjustable components, to accommodate a wide variety of box blanks, still enables set-up operations to be carried out in greatly reduced time, so that machine operation is economical in a much greater number of instances than heretofore.

In addition to the wide versatility and simplified operation achieved in the machine of the invention, provisions are made for manipulation of the box blanks in a greatly improved and highly controlled manner, so that reliable and accurate folding of the box blanks is assured and reject production is reduced to a practical minimum.

It should be understood that the specific form of machine herein illustrated and described is intended to be representative only, as certain changes may be made therein without departing from the clear teachings of the disclosure. Accordingly, reference should be made to the following appended claims in determining the full scope of the invention.

I claim:

1. In a feed control system for a universal box folding machine of the type having a feed means for box blanks, a conveying and folding section arranged to receive box blanks from said feed means, and drive means for said feed means and said conveying and folding section, the improvement characterized by
    (a) said drive means comprising a single, coupled drive system for said feed means and said conveying and folding section, and
    (b) said drive means including a selectively engageable clutch means coupled to said feed means, whereby
    (c) operation of said feed means may selectively be discontinued independently of operation of said conveying and folding sections to accommodate one-at-a-time conveyance of blanks through the machine during set-up, adjusting and like operations.

2. The feed control system of claim 1, in which
    (a) said drive means includes a variable speed drive mechanism coupled to said feed means, whereby
    (b) the speed of operation of said feed means may be varied independently of the speed of operation of said conveying and folding section.

3. The feed control system of claim 1, in which
    (a) said feed means comprises a feed table assembly.

4. In a box folding machine or the like of the type including a feed table for supplying individual flat blanks in succession and at a predetermined feeding speed, and pull-out means for engaging a blank supplied from said feed table and advancing said blank along said machine, the improvement characterized by
    (a) said pull-out means comprising a pair of pull-out rollers aligned generally with the plane of blanks supplied from said feed table,
    (b) said pull-out rollers being positioned one above the other and being arranged to receive and grip blanks received from said feed table,
(c) first drive means for driving one of the pull-out rollers at a first predetermined pull-out speed, and
(d) second drive means for driving the other of the pull-out rollers at a second speed less by a predetermined amount than said pull-out speed,
(e) said second drive means including an overrunning clutch accommodating driving of said other pull-out roller from said one pull-out roller and substantially at said predetermined pull-out speed when a blank is gripped between said rollers.

5. The improvement of claim 4, in which
(a) said other pull-out roller is the upper roller, and
(b) said second drive means drives said upper roller at a peripheral speed on the order of 98% of the peripheral speed of the lower roller.

6. The improvement of claim 4, in which
(a) first journal means are provided for mounting the lower pull-out roller for rotation about a predetermined first axis, and
(b) second journal means are provided for mounting the upper pull-out roller for rotation about a second axis movable toward and away from said first axis,
(c) said second journal means comprising,
  (1) a pair of journal blocks mounted for guided movement toward and away from said first axis and journalling said upper pull-out roller,
  (2) adjustable roll positioning means engaging and supporting said journal blocks in normally fixed positions, for journalling said upper pull-out roller in predetermined spaced relation to said lower pull-out roller, and
  (3) means for urging said journal blocks downward onto said roll positioning means, while accommodating limited upward movement of the blocks.

7. The improvement of claim 4, in which
(a) said pull-out rollers are provided with resilient surface coverings which are deformable under pressure, and
(b) said coverings are so related that the application of pressure between said rollers causes substantially mutually compensating deformations in the coverings of the respective rollers.

8. In a universal box folding machine of the type having a feed table, guide means on the feed table for aligning a box blank in predetermined relation to the longitudinal axis of the machine, conveying and folding means including a longitudinal folding edge, and means for adjusting said folding edge toward and away from the axis of the machine, the improvement which comprises
(a) an alignment indicator mounted in predetermined, normally fixed alignment with said longitudinal folding edge and positioned adjacent said feed table,
(b) said alignment indicator having a portion arranged to be positioned immediately adjacent a blank on said feed table for effective visual indication of the lateral relationship between said indicator and a longitudinally disposed score of a blank on said feed table,
(c) said longitudinal folding edge being movable into desired alignment with said longitudinally disposed score by adjustment of said folding edge to bring said alignment indicator into predetermined aligned relation with said score.

9. The improvement of claim 8, in which
(a) said alignment indicator comprises an indicating pointer retractably mounted adjacent the discharge end of said feed table,
(b) said pointer having an operative position in which said pointer is moved to an extended position directly overlying a blank on said feed table, and
(c) said pointer having a retracted position accommodating the vertical stacking of a large plurality of blanks.

10. The improvement of claim 8, in which
(a) said box folding machine includes a second longitudinally disposed folding edge spaced from the first folding edge,
(b) a second alignment indicator, generally similar to said first indicator, is mounted in predetermined, normally fixed alignment with said second folding edge, and
(c) means are provided for effecting independent lateral adjustment of said folding edges together with their respective alignment indicators.

11. In a universal box folding machine of the type including transport means or conveying a box blank longitudinally, the improvement in said transport means which comprises,
(a) an elongated longitudinally disposed lower frame,
(b) lower transport belt means on said lower frame for engaging the bottom surface of a box blank and advancing the blank longitudinally,
(c) an elongated, longitudinally disposed upper frame positioned above at least a portion of said lower frame,
(d) upper transport belt means on said upper frame for engaging the top surface of a box blank and advancing the blank longitudinally, and
(e) adjustable supporting means for one of said frames providing controlled vertical adjustment of said one frame relative to the other,
(f) whereby said upper and lower transport belt means may be controllably brought into pressure gripping relation to a box blank positioned therebetween for substantially positive transport movement of the blank.

12. The improvement of claim 11, in which said adjustable supporting means comprises,
(a) a pair of longitudinally spaced supporting bars engaging said one frame member at spaced points, and
(b) controllably adjustable cam means engaging and supporting said bars and operative, upon adjustment, to raise and lower said bars.

13. The improvement of claim 12, in which
(a) said cam means comprise slide blocks engaging and supporting spaced areas of each of said supporting bars,
(b) said slide blocks being mounted for horizontal adjusting movement and having inclined supporting surface portions engaging said bars.

14. The improvement of claim 13, which includes
(a) horizontal guide means for said slide blocks, and
(b) cooperating indicator means on said slide blocks and guide means reflecting the vertically adjusted condition of said one frame.

15. The improvement of claim 12, in which
(a) said one frame is the upper frame,
(b) said upper frame comprises a plurality of laterally adjustable upper frame members slidably engaging said supporting bars,
(c) said supporting means including pairs of spaced upright supports mounted in fixed relation on opposite sides of said upper frame,
(d) said cam means being movably mounted in said upright supports, and
(e) pairs of said cam means engaging opposite ends of said supporting bars being adjustable in unison to raise and lower the respective supporting bars.

16. The improvement of claim 15, in which
(a) said lower frame comprises a plurality of laterally adjustable lower frame members,
(b) lower supporting bars are fixed in said upright supports,
(c) said lower supporting bars slidably engaging and supporting said lower frame members, and
(d) interrelated adjusting means are provided for adjusting the upper and lower frame members at one side of the machine laterally toward or away from the longitudinal centerline of the machine in unison.

17. The improvement of claim 11, which includes
(a) a glue wheel disposed at one side of said machine within the longitudinal extent of said upper frame,
(b) said glue wheel being engageable with a surface portion of a blank gripped between and being advanced longitudinally by said upper and lower transport belt means.

18. The improvement of claim 17, which includes
(a) electric motor drive means for rotating said glue wheel, and
(b) control means for varying the speed of said drive means and glue wheel,
(c) such that the peripheral speed of said glue wheel is different from the speed of longitudinal advance of a box blank gripped between said transport belt means.

19. The improvement of claim 18, which includes,
(a) controllable drive means for said transport belts, and in which
(b) said control means includes means interconnected with said controllable drive means whereby the peripheral speed of said glue wheel is variable with the speed of said transport belts while being maintained different therefrom by said control means.

20. The improvement of claim 19 in which,
(a) said control means includes automatic means limiting the minimum peripheral speed of said glue wheel, such that
(b) said glue wheel may be maintained in motion at a predetermined minimum peripheral speed upon discontinuance of motion of said transport belts.

21. In a universal box folding machine of the type having supply means to feed box blanks in succession, transport means to convey said box blanks successively through said machine, and means to fold said blank being conveyed through the machine, the improvement in said transport means which comprises,
(a) a pair of spaced, longitudinally disposed transport belts for engaging and gripping a surface of a box blank,
(b) means supporting said transport belts for independent movement, and
(c) independently adjustable drive means for said transport belts accommodating the driving of said belts at different speeds.

22. The improvement of claim 21, in which said independently adjustable drive means comprises
(a) an adjustable speed motor connected in driving relation to one of said transport belts, and
(b) means including a variable speed drive connecting said drive motor in driving relation to the other of said transport belts.

23. The improvement of claim 21, which includes
(a) a second pair of transport belts disposed above at least portions of the first pair of belts,
(b) means supporting said upper belts for independent movement in opposed and blank-gripping relation to respective ones of the lower belts,
(c) said upper belts being driven by the respective opposed lower belts.

24. The improvement of claim 21, which includes
(a) a second pair of transport belts disposed above at least portions of the first pair of belts,
(b) means supporting said upper belts for independent movement in opposed and blank-gripping relation to respective ones of the lower belts,
(c) and means are provided for driving said upper belts.

25. The improvement of claim 24, in which said means for driving comprises,
(a) a pressure element bearing on a predetermined belt of one of the pair and urging it toward an opposing belt of the other pair.

26. The improvement of claim 25, in which
(a) said pressure element comprises a pressure roller engaging on said predetermined belt,
(b) journal means in the transport for said predetermined belt mounting said pressure roller and urging said roller toward said predetermined belt.

27. In a universal box folding machine of the type having transport means for conveying box blanks longitudinally and successively along a predetermined transport plane, and first and second folding belt means disposed at opposite sides of said machine and arranged to engage opposed foldable outer panels of a box blank and effect folding of said panels inward and substantially into face-to-face relation with a body panel of said box blank lying in said transport plane, the improvement in said folding belt means characterized by
(a) said first and second folding belt means each having vertical fold belt sections including forward belt reaches extending from below the transport plane generally longitudinally and upward to points above said transport plane,
(b) said belt reaches being adapted to engage the respective folding panels of a box blank at points spaced outward of the respective folding axes and to divert said folding panels upward toward vertical disposition,
(c) separate forward tracking frames for said first and second folding belts for supporting said belts through said forward belt reaches,
(d) independent adjusting means for each of said forward tracking frames for separately adjusting said frames to predetermined angles of upward inclination and lateral convergence with respect to the longitudinal axis of said machine, and
(e) independent, adjustable drive means for said folding belts for operating said belts at respective speeds related to the respective adjusted angles of said frames and providing predetermined velocity components in the direction of said longitudinal axis.

28. The improvement of claim 27, in which
(a) said transport means include transport belt means and a main drive motor for operating said transport belt means at predetermined speed, and
(b) said independent, adjustable drive means for said folding belts comprises separate variable speed drive mechanisms connecting the respective folding belts to said main drive motor.

29. The improvement of claim 28, in which said independent, adjustable drive means comprises
(a) first and second drive pulleys, for said first and second folding belts,
(b) said drive pulleys being mounted for rotation about a common axis,
(c) a hollow drive shaft mounting one of said pulleys and connected to one of said variable speed drive mechanisms, and
(d) a quill shaft extending through and projecting beyond said hollow drive shaft,
(e) said quill shaft mounting the other of said pulleys on one projecting portion and being connected to the other of said variable speed drive mechanisms.

30. The improvement of claim 29, in which
(a) said machine includes a pair of spaced, longitudinally disposed side frames carrying said transport belt means and adjustable laterally toward and away from the longitudinal axis of the machine,
(b) spaced, fixed supports are mounted on opposite sides of the machine axis spaced outward from said side frames,
(c) said hollow drive shaft extends generally from one of said fixed supports to said machine axis, and
(d) said quill shaft extends from said one fixed support to the other.

31. The improvement of claim 27, which includes
(a) separate rearward tracking frames for said first and second folding belts for supporting said belts through rearward belt reaches in which said panels are flat folded, (b) spaced side frames forming part of said machine and supporting said transport belt means, (c) said side frames being adjustable laterally toward and away from the longitudinal axis of the machine, (d) said rearward tracking frames being mounted in generally fixed lateral relation to respective ones of said side frames, and (e) said forward tracking frames being connected to said rearward tracking frames for pivotal movement relative thereto at least in a lateral direction.

32. The improvement of claim 31, in which
(a) said rearward tracking frames comprise separate, pivotally connected tracking frame sections,
(b) first vertical adjustment means connecting the forwardmost end of one section of each tracking frame to a side frame, and
(c) second vertical adjustment means connecting the forwardmost end of the other section of each tracking frame to a side frame.

33. In a universal box folding machine of the type having a transport belt for conveying a box blank longitudinally in a predetermined horizontal transport plane, and a folding belt for engaging a foldable outer panel of a longitudinally advancing box blank and causing said panel to be folded into a substantially horizontal, flat folded position overlying other portions of said box blank, the improvement which comprises
(a) means for guiding said folding belt into close, overlying relation to said transport belt, at a predetermined distance in advance of the discharge end of the machine, and for maintaining said close, overlying relation up to said discharge end,
(b) said discharge end being defined by an upper return pulley for said folding belt, about which said folding belt passes upwardly, and a lower return pulley for said transport belt, about which said transport belt passes downwardly,
(c) said return pulleys being disposed generally in vertically aligned relation, and
(d) resilient mounting means for said lower return pulley accommodating downward movement of the pulley in response to the passage of a folded box blank through and out of the discharge end of the machine.

34. The improvement of claim 33, in which said resilient mounting means comprises
(a) pivoted lever means mounting said lower return pulley, and
(b) spring means acting on said lever means to urge said lower return pulley in an upward direction.

35. The improvement of claim 34, in which
(a) adjustable means are provided to limit upward movement of said lower return pulley relative to said upper return pulley to provide a predetermined space at said discharge end for the passage of folded box blanks.

36. The improvement of claim 33, in which
(a) a plurality of pressure-urged tracking wheels act upon said folding belt in a generally downward direction over a predetermined distance in advance of said discharge end.

37. The improvement of claim 36, in which
(a) said spring-urged tracking wheels are mounted on pivoted levers,
(b) said levers are mounted for pivoting movement about axes below said folding belts, and
(c) spring means act on said pivoted levers to urge said levers in a direction to bear generally downward on said tracking wheels.

38. In a machine for folding corrugated box blanks and the like, the combination of
(a) a pair of spaced transport belts for supporting box blanks and conveying them along a predetermined transport plane,
(b) means positioned adjacent said transport belts for engaging and folding outer panels of said blanks through approximately 180 degrees, and
(c) suction means operating through said transport belts for holding said blanks on said belts during at least a portion of the final 90 degrees of folding.

39. The machine of claim 38, in which
(a) said transport belts are of perforate construction,
(b) transport frames are provided for said belts, including channel-like suction chambers sealed in part by said belts, and
(c) means are provided for applying suction to said chambers.

40. A feed table for a machine for folding corrugated box blanks and the like, comprising
(a) a suction belt having a horizontal reach for supporting and advancing the lowermost box blank of a vertical stack thereof,
(b) vertically disposed front edge guide means disposed above the horizontal reach of said belt adjacent the discharge end thereof and forming normal front edge stops for engagement with the front edges of the stacked box blanks, and
(c) auxiliary front edge stops removably mountable over the horizontal reach of said suction belt and spaced rearward of said front edge guide means,
(d) pressure wheels disposed between said auxiliary front edge stops and said front edge guide means and positioned to bear against a blank being advanced on said suction belt, and
(e) means for adjusting said auxiliary front edge stops laterally into predetermined alignment with blanks supported on said feed table.

41. In a universal box folding machine of the type including adjustable transport frame means for conveying a foldable box blank along a longitudinal path in a predetermined transport plane and means for gripping central portions of the blank as it is conveyed in said transport plane and folding means disposed at an angle to said transport plane and positioned to engage and divert the leading edge portion of a foldable outer panel of a box blank longitudinally advanced in said transport plane, the improvement which comprises:
(a) straight edge means defining a longitudinally extending folding edge about which an outer panel of said blank may be folded toward said central portions along a predetermined fold axis;
(b) a pre-break element mounted adjacent said folding edge on one side of said transport plane and in advance of said folding means,
(c) actuating means for projecting said pre-break element through said transport plane in the direction of folding of said foldable panel, and
(d) control means responsive to the passage of said panel by said pre-break element to energize said actuating means and thereby to project said pre-break element against said panel with a predetermined impact and through said transport plane,
(e) whereby an initial pre-breaking of said panel along said longitudinally extending axis generally defined by said straight edge means is effected prior to engagement of said panel by said folding means.

42. The improvement of claim 41, in which
(a) said pre-break element and said control means are relatively adjustable longitudinally of said machine,
(b) whereby said pre-break element is adapted to engage predetermined areas of foldable panels of various lengths.

43. The improvement of claim 41, in which
(a) said pre-break element is adjustable laterally relative to said folding edge,
(b) whereby said pre-break element is adapted to engage foldable panels of box blanks at varying lateral distances from the fold axes of said blanks.

44. The improvement of claim 42, in which
(a) said machine includes means forming a second longitudinally extending straight edge and a second folding means, for the accommodation of box blanks foldable along spaced longitudinally disposed fold axes,
(b) a second pre-break element is mounted adjacent said second straight edge in advance of said second folding means,
(c) said second pre-break element is actuable under the control of said control means, and
(d) said first and second pre-break elements are adjustable longitudinally, one with respect to the other, for the accommodation of a box blank having opposed foldable panels of different lengths.

45. The improvement of claim 41, in which
(a) said straight edge means and said pre-break element are carried by said adjustable transport frame means.

46. In a universal box machine of the type having transport means for conveying a box blank longitudinally in a predetermined horizontal transport plane and folding belt means for engaging a foldable outer panel of a longitudinally advancing box blank and causing said panel to be folded from a substantially vertical position to a substantially horizontal, flat folded position, the improvement characterized by
(a) said folding belt means comprising a folding belt and a folding belt tracking frame mounted in predetermined relation to said transport belt means and extending generally longitudinally of said machine and toward its longitudinal axis,
(b) said belt tracking frame including a plurality of longitudinally spaced back-up and guide elements for said folding belt,
(c) said tracking frame comprises a pair of connected tracking frame sections disposed in angular relation as viewed in a horizontal direction,
(d) the forward one of said tracking frame sections being disposed at a larger acute angle to said transport plane than the rearward one of said tracking frame sections,
(e) said tracking frame and said back-up and guide elements being so arranged and disposed as to effect substantially uniform angular folding of said panel per unit of longitudinal travel of said box blank throughout the entire operation of folding said panel from said substantially vertical position to said substantially horizontal, flat folded position.

47. The improvement of claim 46, in which
(a) the relative lengths and angular relation of said tracking frame sections are such that substantially 25° to 30° of folding of said panel is effected while a box blank is being advanced along said forward tracking frame section.

48. The improvement of claim 47, in which
(a) said back-up and guide elements comprise a plurality of belt training wheels,
(b) said belt training wheels are spaced substantially uniformly lengthwise of the machine, and
(c) each of said belt training wheels is disposed at an angle relative to the next preceding and next subsequent wheel,
(d) said wheels training said folding belt through a path such that a foldable panel of said box blank is folded through a predetermined angle as said blank travels from one training wheel to another, which angle is substantially equal to the quotient of 90° divided by the number of belt training wheels on said tracking frame.

49. The improvement of claim 46, in which
(a) said tracking frame sections are pivotally connected,
(b) first vertical adjustment means are provided for controllably raising and lowering the free forward end of the forward tracking frame section,
(c) second vertical adjustment means are provided for raising and lowering the connected ends of said tracking frame sections, and
(d) means are provided for pivotally mounting the rearward end of the rearward tracking frame section.

50. In a universal box machine of the type having means for transporting a box blank along a longitudinal path in a predetermined transport plane while gripping central portions of the blank and folding an outer panel portion into a substantially vertical position with respect to the central portions, the improvement which includes
(a) folding means for engaging said outer panel and folding it from said substantially vertical position to a substantially horizontal, flat folded position,
(b) said folding means generally defining a predetermined geometric curve,
(c) said curve being so arrayed and disposed as to effect substantially uniform angular folding of said panel per unit of longitudinal travel of said box blank throughout the entire operation of folding said panel from said substantially vertical position to said substantially horizontal flat folded position.

51. A box folding machine in accordance with claim 50, in which
(a) said curve is defined by a plurality of mechanical elements.

52. A box folding machine in accordance with claim 51, in which
(a) said elements support a member which is continuous.

53. A box folding machine in accordance with claim 50, in which
(a) said elements are rotatable.

54. A box folding machine in accordance with claim 53, in which
(a) said elements support a moving folding belt.

55. In a machine for folding corrugated box blanks and the like into collapsed carton tubes, said machine being of the type including transport means for conveying box blanks in a predetermined transport plane while gripping central portions thereof, and means acting in conjunction with the transport means for folding outer panels of said box blanks along at least one longitudinal fold axis defined by a scored indentation on one surface thereof, which surface is to be an inner surface of the finished tube, the improvement which comprises
(a) prewetting means positioned adjacent said transport means and in advance of said folding means for applying moisture to the other surface of said box blank,
(b) said prewetting means being positioned to apply moisture to said other surface in a predetermined, longitudinal area of said box blank which includes said fold axis.

56. The improvement of claim 55, in which said prewetting means comprises
(a) a liquid supply means positioned adjacent the transport plane of said blank,
(b) a brushlike element of predetermined effective width communicating with said liquid supply means and having a free end portion projecting into said transport plane for wiping engagement with a blank being conveyed in said plane,
(c) said brushlike element and said liquid supply means are mounted below said transport plane.
(d) said brushlike element is partially immersed in liquid contained in said supply means, and
(e) a deflector plate is mounted above said transport plane and said supply means and generally opposite the free end of said brushlike element to deflect moisture spray upon the passage of the trailing end of a box blank beyond said brushlike element.

References Cited by the Examiner

UNITED STATES PATENTS

| | | | |
|---|---|---|---|
| 681,602 | 8/1901 | Wiest et al. | 93—58.1 X |
| 1,089,402 | 3/1914 | Downing | 93—58.1 |
| 1,894,317 | 1/1933 | Link | 118—41 |
| 2,139,890 | 12/1938 | Fitchett | 93—58.1 |
| 2,354,251 | 7/1944 | Fiore | 93—52 X |
| 2,566,021 | 8/1951 | Fergnani | 198—165 |
| 2,630,206 | 3/1953 | Fergnani | 198—165 |
| 2,701,990 | 2/1955 | Fergnani | 93—52 |
| 2,804,000 | 8/1957 | Lubersky | 93—49 |
| 2,823,594 | 2/1958 | Fischer | 93—49 |
| 2,931,277 | 4/1960 | La Bombard | 93—52 |
| 2,979,330 | 4/1961 | Weber | 271—36 |
| 2,982,189 | 5/1961 | Shields | 93—49 |
| 2,995,361 | 8/1961 | Lopez. | |
| 3,012,482 | 12/1961 | French et al. | 93—49 |
| 3,027,816 | 4/1962 | Kirby et al. | 93—58.1 |
| 3,085,480 | 4/1963 | Kauffman et al. | 93—52 |
| 3,110,232 | 11/1963 | Frei | 93—49 |

BERNARD STICKNEY, *Primary Examiner.*

FRANK E. BAILEY, *Examiner.*